United States Patent
Iijima

(10) Patent No.: US 9,558,061 B2
(45) Date of Patent: Jan. 31, 2017

(54) INFORMATION PROCESSING APPARATUS AND INFORMATION PROCESSING METHOD

(71) Applicant: FUJITSU LIMITED, Kawasaki-shi, Kanagawa (JP)

(72) Inventor: Hisanori Iijima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 14/792,886

(22) Filed: Jul. 7, 2015

(65) Prior Publication Data

US 2016/0011931 A1    Jan. 14, 2016

(30) Foreign Application Priority Data

Jul. 10, 2014    (JP) .................................. 2014-142233

(51) Int. Cl.
  *G06F 11/00*    (2006.01)
  *G06F 11/07*    (2006.01)

(52) U.S. Cl.
  CPC ....... *G06F 11/0793* (2013.01); *G06F 11/0727* (2013.01)

(58) Field of Classification Search
  USPC ...................................................... 714/6.12
  See application file for complete search history.

(56) References Cited

U.S. PATENT DOCUMENTS

| | | | | |
|---|---|---|---|---|
| 5,819,024 A | * | 10/1998 | Kasuga | G06F 11/0715 714/26 |
| 6,105,150 A | * | 8/2000 | Noguchi | G06F 11/0778 714/44 |
| 2006/0041739 A1 | | 2/2006 | Iwakura et al. | |
| 2010/0162052 A1 | * | 6/2010 | Shimogawa | G06F 11/3476 714/48 |

FOREIGN PATENT DOCUMENTS

| | | |
|---|---|---|
| JP | 07-183891 | 7/1995 |
| JP | 2006-072997 | 3/2006 |
| JP | 2007-133544 | 5/2007 |
| JP | 2007-334403 | 12/2007 |

* cited by examiner

*Primary Examiner* — Sarai Butler
(74) *Attorney, Agent, or Firm* — Fujitsu Patent Center

(57) ABSTRACT

An information processing apparatus capable of generating a partition including a plurality of units having hardware devices and the partition operating as an information processing unit by combining the units, the information processing apparatus comprising a processor executing a process that causes the information processing apparatus to perform selecting, upon occurrence of a fault in the partition, a unit as a processing target of a dump process of acquiring dump data from the units included in the partition with the occurrence of the fault, executing the dump process for the unit selected by the selecting and generating the partition by combining the units completing the execution of the dump process.

12 Claims, 24 Drawing Sheets

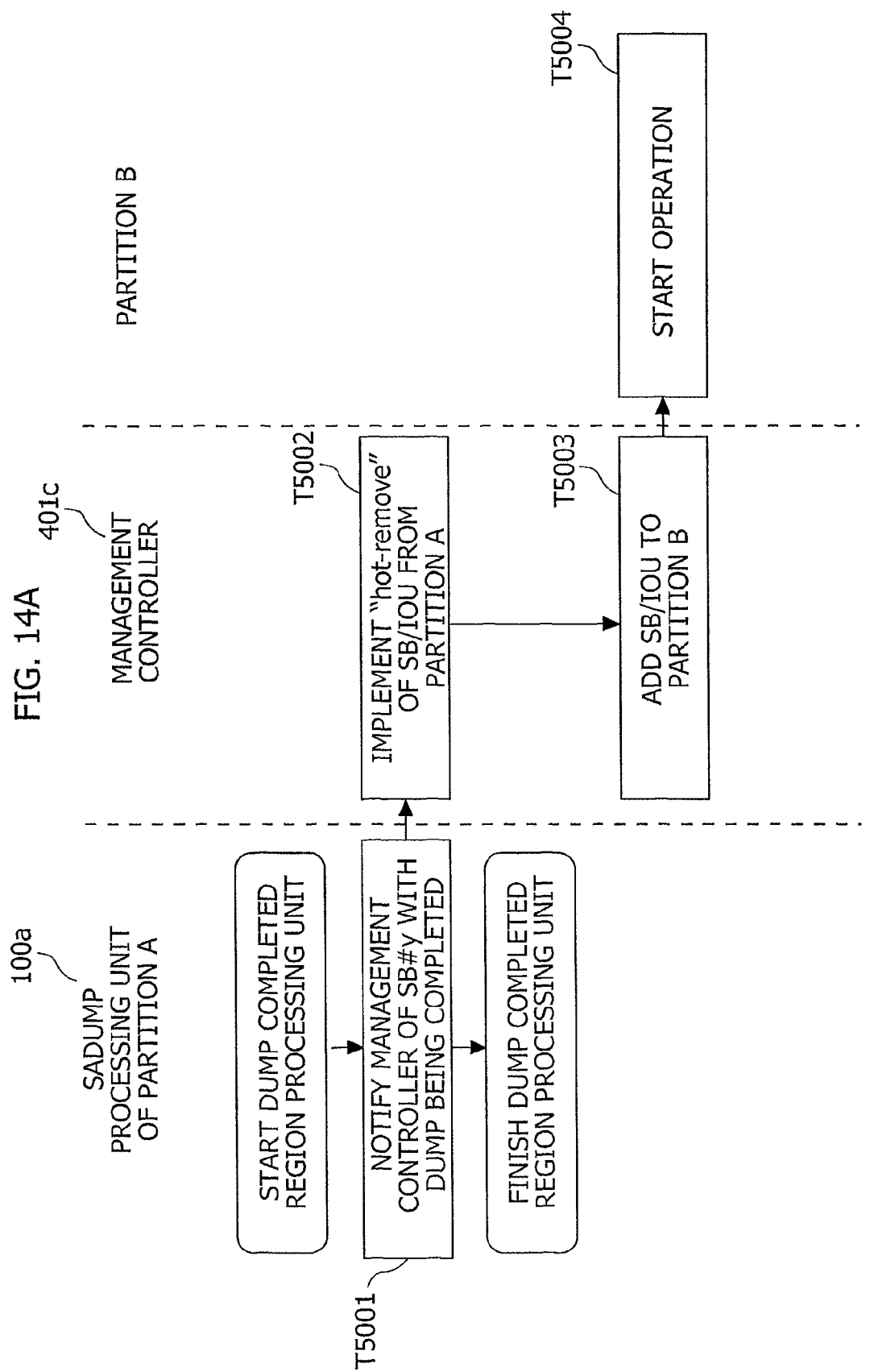

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2014-142233, filed on Jul. 10, 2014, the entire contents of which are incorporated herein by reference.

FIELD

The embodiments discussed herein are related to an information processing apparatus and an information processing method.

BACKGROUND

A dump process is exemplified as a method of acquiring information, upon a fault, from an information processing apparatus encountering occurrence of the fault. The dump process includes a process of storing, in an auxiliary storage unit or other equivalent storages, data stored in a main storage unit of the information processing apparatus and a register or other equivalent storage areas of a Central Processing Unit (CPU). The present specification hereinafter defines the information acquired by the dump process as dump data. The dump process is executed by firmware instanced by Basic Input/Output System (BIOS) and other equivalent firmware or executed by Operating System (OS). A Stand Alone DUMP (SADUMP) process executed by the firmware instanced by the BIOS and other equivalent firmware, is one example of the dump process.

DOCUMENT OF PRIOR ART

Patent Document

[Patent Document 1] Japanese Laid-open Patent Publication No. H7-183891
[Patent Document 2] Japanese Laid-open Patent Publication No. 2007-334403
[Patent Document 3] Japanese Laid-open Patent Publication No. 2006-072997
[Patent Document 4] Japanese Laid-open Patent Publication No. 2007-133544

SUMMARY

One aspect of a technology of the disclosure is exemplified by an information processing apparatus that follows. An information processing apparatus capable of generating a partition including a plurality of units having hardware devices and the partition operating as an information processing unit by combining the units, the information processing apparatus comprising a processor executing a process that causes the information processing apparatus to perform selecting, upon occurrence of a fault in the partition, a unit as a processing target of a dump process of acquiring dump data from the units included in the partition with the occurrence of the fault, executing the dump process for the unit selected by the selecting and generating the partition by combining the units completing the execution of the dump process.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 14A is a flowchart illustrating a processing flow of a dump completed region processing unit in the embodiment.

DESCRIPTION OF EMBODIMENTS

The SADUMP process is executed by the firmware instanced by the BIOS or other equivalent firmware when the OS or other equivalent system software stops due to the fault. The information processing apparatus therefore has a possibility of being disabled from executing processes other than the SADUMP process during the execution of the SADUMP process. As a result, this leads to another possibility of stopping a service or other equivalent activities being provided so far by the information processing apparatus during the execution of the SADUMP process. In addition, a period of processing time of the SADUMP process is elongated as a capacity of an memory of the information processing apparatus increases. Consequently, this leads to still another possibility that a service operating ratio of the information processing apparatus decreases. Such being the case, one aspect of the technology of the disclosure restrains the decrease in service operating ratio of the information processing apparatus due to the SADUMP process.

An information processing apparatus according to one embodiment will hereinafter be described with reference to the drawings. A configuration of the following embodiment is an exemplification, and the information processing apparatus is not limited to the configuration of the embodiment.

Comparative Example

A comparative example exemplifies the information processing apparatus enabled to generate partitions by combining an arbitrary number of JO units each including a system board mounted with a CPU, a memory and other equivalent components, and an IO device. The generated partition can operate as an independent information processing apparatus. The partition provides an external information processing apparatus with a service instanced by a Web service and other equivalent services. Upon occurrence of a fault in the partition, the dump data is acquired to troubleshoot the fault caused therein. The dump data contains, e.g., data stored in the memory and a register of the CPU. A process of acquiring the dump data is a SADUMP process that is executed by, e.g., BIOS. A case of the occurrence of the fault in the partition entails executing the SADUMP processes of all of the system boards and the IO units included in the partition in the comparative example. The service provided by this partition is restarted after executing the SADUMP processes of all of the system boards and the IO units. The comparative example will hereinafter be described with reference to FIGS. 1 through 7.

Figure 1:
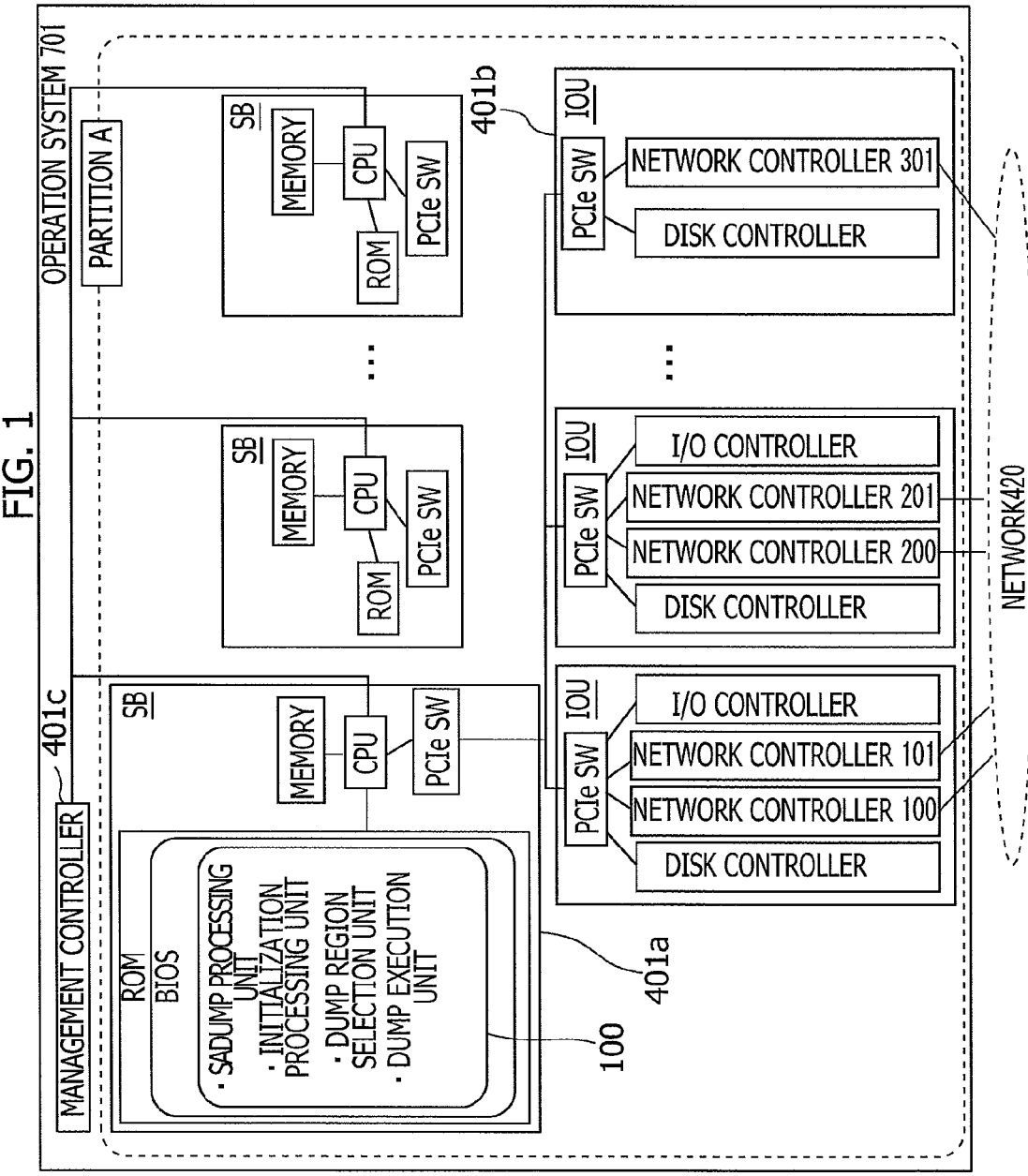
FIG. 1 is a diagram illustrating an operation system in a comparative example.

FIG. 1 is a diagram illustrating an operation system 701 in the comparative example. The operation system 701 is connected to an unillustrated external appliance via a network 420.

The operation system 701 is the information processing apparatus. The operation system 701 includes a system board 401a, an IO unit 401b and a management controller 401c. The operation system 701 can generate the partition by combining an arbitrary number of system boards 401a and IO units 401b. The generated partition can operate as the independent information processing apparatus. The operation system 701 is capable of generating a plurality of partitions. A partition A in FIG. 1 is generated by all of the system boards 401a and the IO units 401b mounted on the operation system 701. The partition A provides the service instanced by the Web service and other equivalent services to another information processing apparatus connected via, e.g., the network 420.

A dynamic partition is exemplified as a technology of generating the partition. The dynamic partition is enabled to add or remove the system board 401a to or from the partition on which an OS runs. The present specification hereinafter defines "hot-add" as a process of adding the system board 401a to the partition on which the OS runs. The present specification further hereinafter defines "hot-remove" as a process of removing the system board 401a from the partition on which the OS runs. The management controller 401c executes "hot-add" and "hot-remove" in response to an instruction of the BIOS. A number of the system boards 401a included in an active partition can be varied by the dynamic partition.

The system board 401a includes a CPU, a memory, a Read Only Memory (ROM) and a PCI Express Switch (PCIeSW). The CPU, the memory, the ROM and the PCIeSW are interconnected via a bus. The CPU of the system board 401a is connected to the management controller 401c via the bus. The CPU deploys a program and other equivalent software on an operation area of the memory in an executable manner, and controls peripheral devices by executing the program and other equivalent software. The information processing apparatus instanced by the partition A or other equivalent partitions is thereby enabled to execute a process matching with a predetermined purpose. The memory is a recording medium that is readable by the information processing apparatus instances by the partition A or other equivalent partitions. The memory has a reserved area for storing data stored in the register of the CPU to be acquired through the SADUMP process. The present specification hereinafter defines, as a reserved area of the memory, a memory area reserved for storing the data stored in the register of the CPU. The memory and the ROM are exemplified as a storage unit to be accessed directly from the CPU. The memory is a volatile storage unit. The memory is, e.g., a Random Access Memory (RAM). The ROM is a nonvolatile storage unit. For example, the BIOS is stored in the ROM. The BIOS includes a SADUMP processing unit 100. The system board 401a is connected to the IO unit 401b via the PCIeSW. Note that the system board 401a is abbreviated to "SB" in the drawing.

The IO unit 401b includes an IO device. The IO device is, e.g., an input/output device. The IO device is exemplified by an IO controller, a network controller or a disk controller. The IO unit 401b is connected to the system board 401a via the PCIeSW. Setting information of each IO device included in the IO unit 401b is stored in the memory of the system board 401a. Hot Plug of the PCI adds or removes the IO unit 401b to or from the partition. The management controller 401c executes the Hot Plug of the PCI. Note that the IO unit 401b is abbreviated to "IOU" in the drawing.

An unillustrated hard disk is connected to the disk controller of the IO unit 401b. The hard disk has a reserved area for storing the dump data. The present specification hereinafter defines a hard disk area reserved for storing the dump data as a reserved area of the hard disk. The hard disk corresponds to an auxiliary storage unit of the partition A. The hard disk stores various categories of programs and various items of data on the non-transitory recording medium in a readable/writable manner. The hard disk is also called an external storage device. The OS, the various categories of programs, a variety of tables and other equivalent information are stored on the hard disk.

The auxiliary storage unit of the partition A may be attained in an aspect other than the hard disk. The auxiliary storage unit may involve using an Erasable Programmable ROM (EPROM), a Solid State Disk (SSD) and other equivalent storages. The auxiliary storage unit may further involve using a Compact Disc (CD) drive, a Digital Versatile Disc (DVD) drive, a Blu-ray (registered trademark) Disc (BD) drive and other equivalent drives. The auxiliary storage unit may still further involve using a Network Attached Storage (NAS) or a Storage Area Network (SAN).

The non-transitory recording medium readable by the information processing apparatus and other equivalent apparatuses connotes a non-transitory recording medium capable of accumulating information instanced by data, programs and other equivalent information electrically, magnetically, optically, mechanically or by chemical action, which can be read from the information processing apparatus and other equivalent apparatuses. Among these non-transitory recording mediums, the mediums removable from the information processing apparatus and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM (Read-Only Memory) and other equivalent recording mediums are given as the non-transitory recording mediums fixed within the partition A.

The network 420 is a computer network to interconnect the information processing apparatuses. The network 420 may be a wireless network and may also be a wired network. A variety of network systems can be applied to the network 420, these network systems being instanced by the Internet, a telephone line, a Virtual Private Network (VPN), a Local Area Network (LAN), a private bus provided by a computer maker, a fiber channel (FV) or a wireless LAN and other equivalent network systems.

Figure 2:
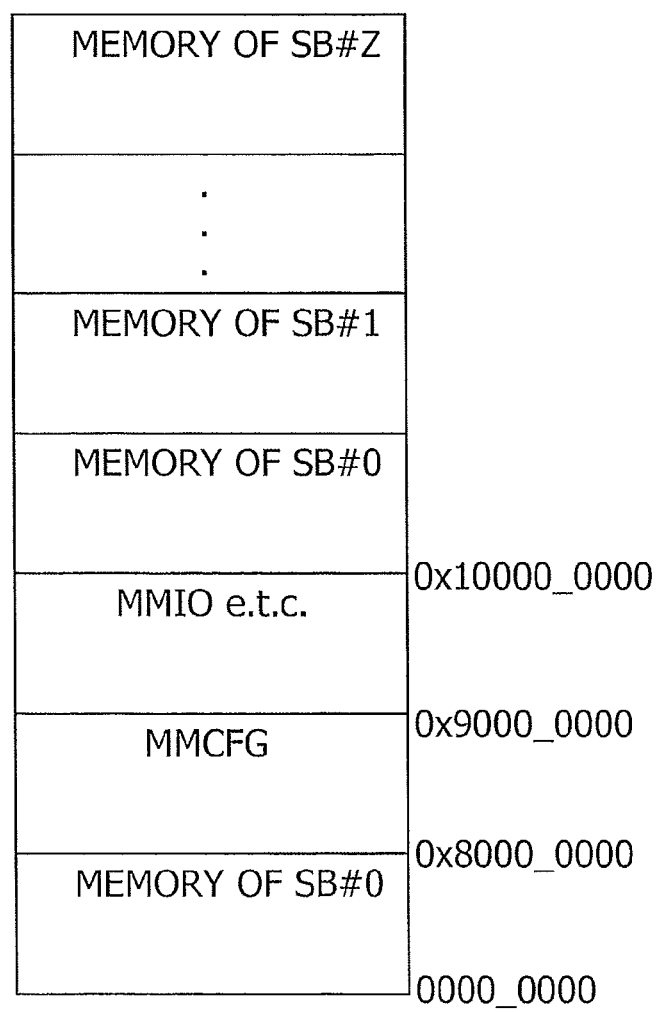
FIG. 2 is a diagram illustrating a system address map of a partition generated by the operation system.

FIG. 2 is a diagram illustrating a system address map of the partition generated by the operation system 701. FIG. 2 illustrates the system address map based on x86 architecture by Intel Corp. The x86 architecture is hereinafter simply referred to as x86 in the present specification. An area of "0x80000000" through "0x100000000" is an area used by the IO device according to x86. The area used by the IO device contains a Memory Mapped Configuration (MMCFG) region and a Memory Mapped Input/Output (MMIO) region. The MMCFG region is used as a PCI configuration space for each IO device. Setting information of each IO device is stored in the PCI configuration space. The MMIO region is used for the CPU of the information processing apparatus to access the IO device. "SB#0-SB#z" in FIG. 2 represent address spaces allocated to the memories of the respective system boards 401a.

<Processing Block of SADUMP Processing Unit 100>

Figure 3:
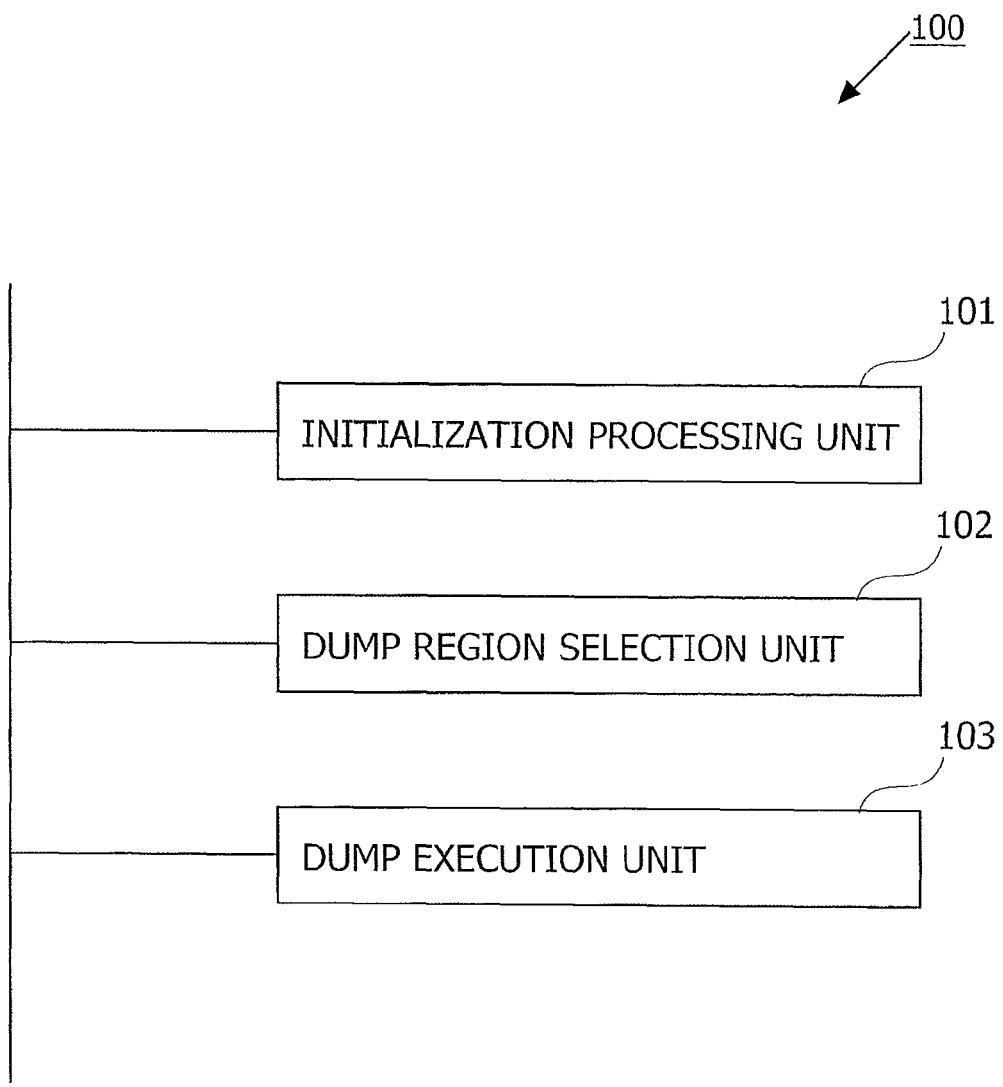
FIG. 3 is a diagram illustrating processing blocks of a SADUMP processing unit.

FIG. 3 is a diagram illustrating processing blocks of the SADUMP processing unit 100. FIG. 3 illustrates an initialization processing unit 101, a dump region selection unit 102 and a dump execution unit 103 as the processing blocks of the SADUMP processing unit 100. The CPU equipped in the system board 401a in FIG. 1 executes the computer program deployed in the executable manner on the memory to operate as the respective processing blocks in FIG. 3. However, at least a part of any one of the blocks in FIG. 3 may include a hardware circuit.

The initialization processing unit 101 executes an initializing process of the SADUMP process. The initialization processing unit 101 copies the data stored in the register of the CPU to the reserved area of the memory in the initializing process of the SADUMP process. The initialization processing unit 101 issues an INIT interrupt in the initializing process of the SADUMP process. With the INIT interrupt, the BIOS of the partition A initializes the partition A while omitting the memory initializing process. The initialization processing unit 101 initializes the disk controller by loading a hard disk driver. The disk controller being initialized, the hard disk connected to the disk controller of the IO unit 401b is used as an output destination of the dump data.

The dump region selection unit 102 selects the system board 401a and the IO unit 401b included in the partition A encountering the occurrence of the fault as SADUMP processing targets. The dump region selection unit 102 acquires the system address map from the register of the CPU. The dump region selection unit 102 selects, based on the acquired system address map, the system board 401a and the IO unit 401b included in the partition A encountering the occurrence of the fault as the SADUMP processing targets. All of the system boards 401a and the IO units 401b included in the partition A encountering the occurrence of the fault are selected based on the system address map as the SADUMP processing targets in the comparative example.

The dump execution unit 103 executes the SADUMP process for each of the system boards 401a and the IO units 401b selected by the dump region selection unit 102. The dump execution unit 103 reads an address region of the selected system board 401a or IO unit 401b, and copies the readout information to the reserved area prepared in the hard sick connected to the IO unit 401b.

<Flow of SADUMP Process in Comparative Example>

Figure 4:
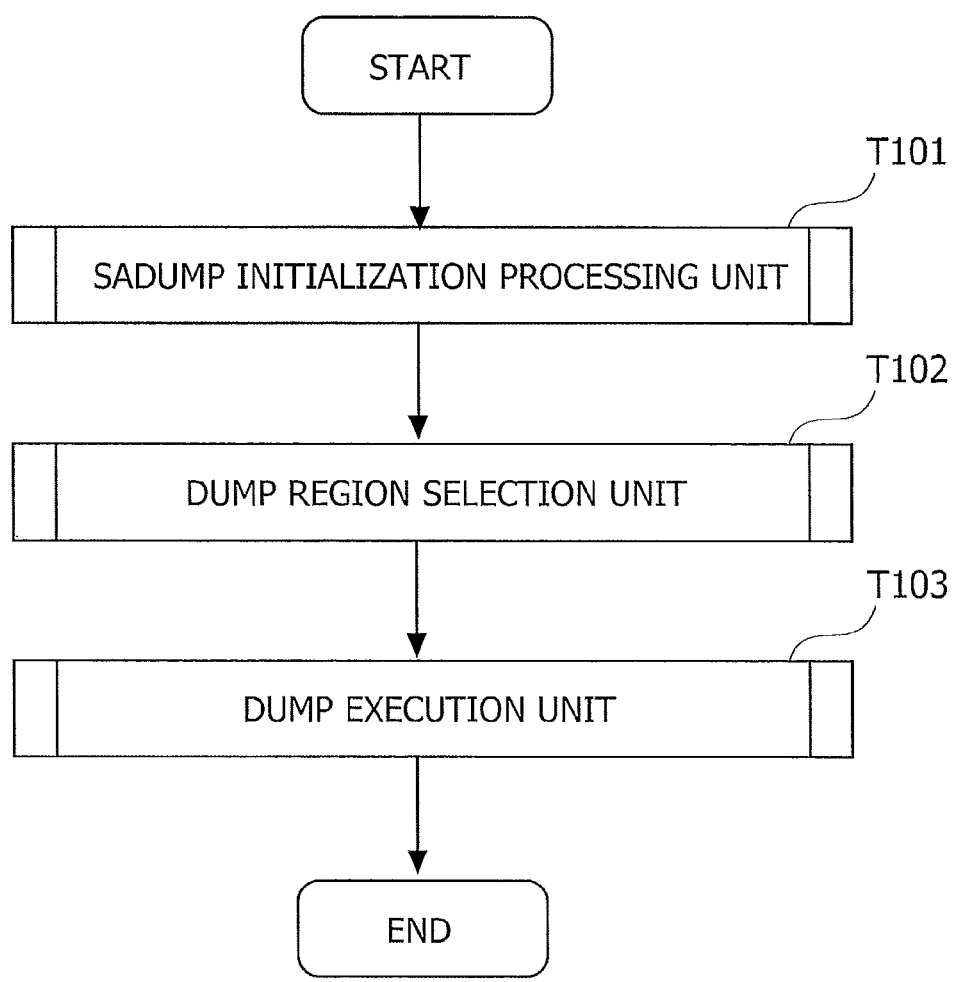
FIG. 4 is a flowchart illustrating a flow of the SADUMP process in the comparative example.

FIG. 4 is a flowchart illustrating a flow of the SADUMP process in the comparative example. The flow of the SADUMP process by the SADUMP processing unit 100 when the fault occurs in the partition A, will hereinafter be described with reference to FIG. 4.

The initialization processing unit 101 executes the initializing process in T101. The initializing process includes a process of initializing the disk controller connected to the hard disk serving as the output destination of the dump data. The dump region selection unit 102 selects SADUMP processing target regions in T102. The SADUMP processing target regions are all of the system boards 401a and the IO units 401b included in the partition A in the comparative example. The dump execution unit 103 executes in T103 the SADUMP process for the areas selected in T102.

Figure 5:
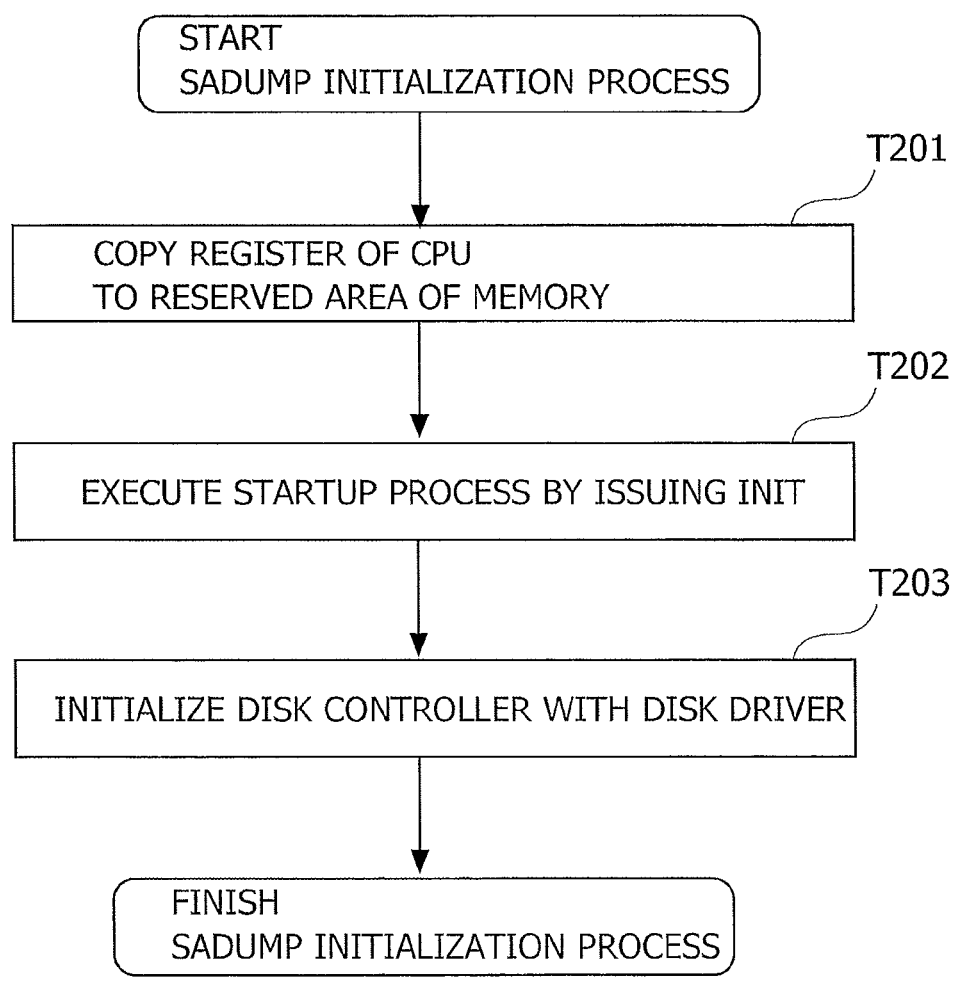
FIG. 5 is a flowchart illustrating a processing flow of an initialization processing unit in the comparative example.
Figure 6:
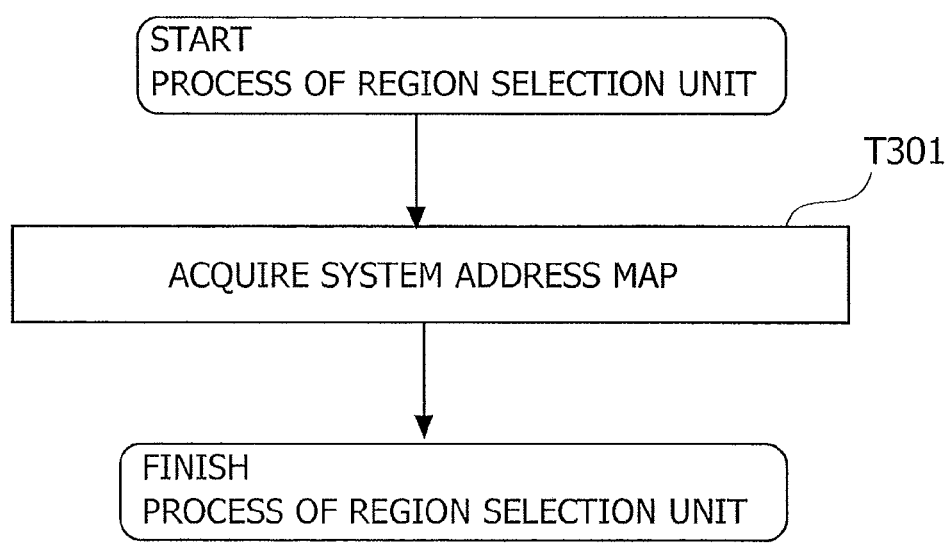
FIG. 6 is a flowchart illustrating a processing flow of a dump region selection unit in the comparative example.
Figure 7:
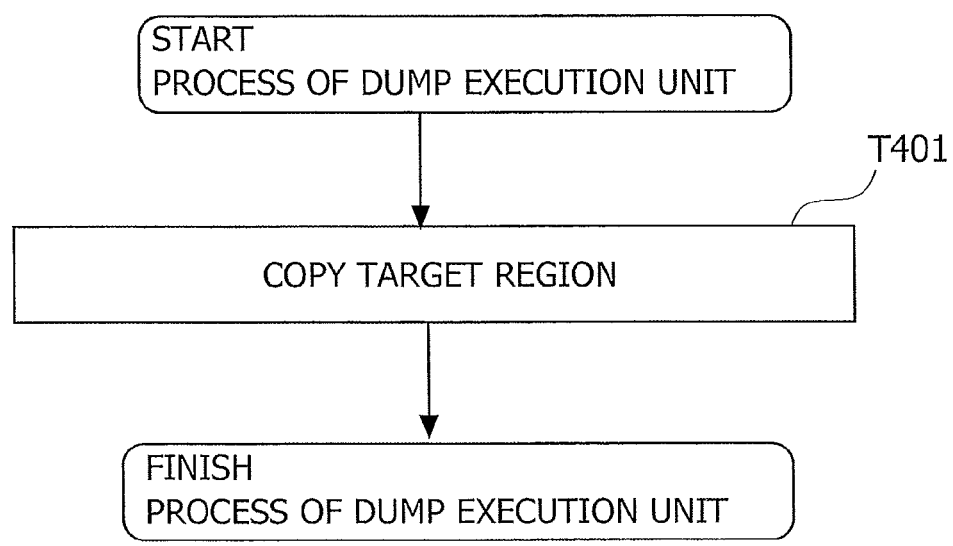
FIG. 7 is a flowchart illustrating a processing flow of a dump execution unit in the comparative example.

FIGS. 5 through 7 are explanatory flowcharts of details of the processes illustrated in FIG. 4. The processes illustrated in FIG. 4 will hereinafter be described in detail with reference to FIGS. 5 through 7.

FIG. 5 is the flowchart illustrating a processing flow of the initialization processing unit 101 in the comparative example. The initialization processing unit 101 copies the data stored in the register of the CPU to the reserved area of the memory in T201. The initialization processing unit 101 issues the INIT interrupt in T202. With the INIT interrupt, the BIOS of the partition A initializes the partition A while omitting the memory initializing process. The initialization processing unit 101 initializes the disk controller by loading the hard disk driver T203.

FIG. 6 is the flowchart illustrating a processing flow of the dump region selection unit 102 in the comparative example. The processes of the dump region selection unit 102 will hereinafter be described with reference to FIG. 6. The dump region selection unit 102 acquires the system address map from the register of the CPU in T301. The dump region selection unit 102 selects the SADUMP processing target regions by referring to the acquired system address map. The areas to be selected include all of the memory areas allocated to the system boards 401a and the MMCFG regions of the IO units 401b included in the partition A. The memory areas allocated to the system boards 401a are exemplified by memories of SB#0-SB#z in FIG. 2.

FIG. 7 is the flowchart illustrating processes of the dump execution unit 103 in the comparative example. A processing flow of the dump execution unit 103 is described with reference to FIG. 7. The dump execution unit 103 reads contents of the SADUMP processing target region selected by the dump region selection unit 102 in T401. The read contents of the memory are copied to the reserved area of the hard disk. On this occasion, a value of the register, which has been copied to the reserved area of the memory, is also copied to the reserved area of the hard disk. The dump execution unit 103 is enabled by this process to copy, to the hard disk, the contents of the memory and the setting information of the IO device that are included in the partition A. The partition A is thereafter restarted to resume providing the service.

The partition A is disabled from executing other processes till completing the SADUMP processes for all of the system boards 401a and the IO units 401b that are included in the partition A encountering the occurrence of the fault in the comparative example described above. A possibility is therefore that a period of stopping time of the service provided by the partition A becomes long as a memory capacity as a SADUMP processing target memory increases.

Embodiment

The partition A does not resume the service till completing the SADUMP processes for all of the system boards 401a and the IO units 401b included in the partition A encountering the occurrence of the fault in the comparative example. An embodiment discusses the information processing apparatus to execute the SADUMP process preferentially for the system board 401a including a smaller number of memories or the IO unit 401b including a smaller number of IO devices. The information processing apparatus generates a new partition by the system board 401a and the IO unit 401b with the SADUMP process being finished. The new partition takes over the service being provided so far by the partition encountering the occurrence of the fault. Afterward, there continue the SADUMP processes for the system boards 401a and the IO units 401b included in the partition with the occurrence of the fault in parallel with the operation of the new partition. The new partition can therefore resume the service being provided so far by the partition encountering the occurrence of the fault without waiting for the completion of the SADUMP processes for all of the system boards 401a and the IO units 401b. The system board 401a and the IO unit 401b are one example of a "unit". The partition A is one example of a "partition operating as an information processing unit in combination with the unit". The embodiment will hereinafter be described with the reference to the drawings. Note that the same components in the embodiment as the components in the comparative example are marked with the same numerals and symbols, and detailed descriptions thereof are omitted.

Figure 8:
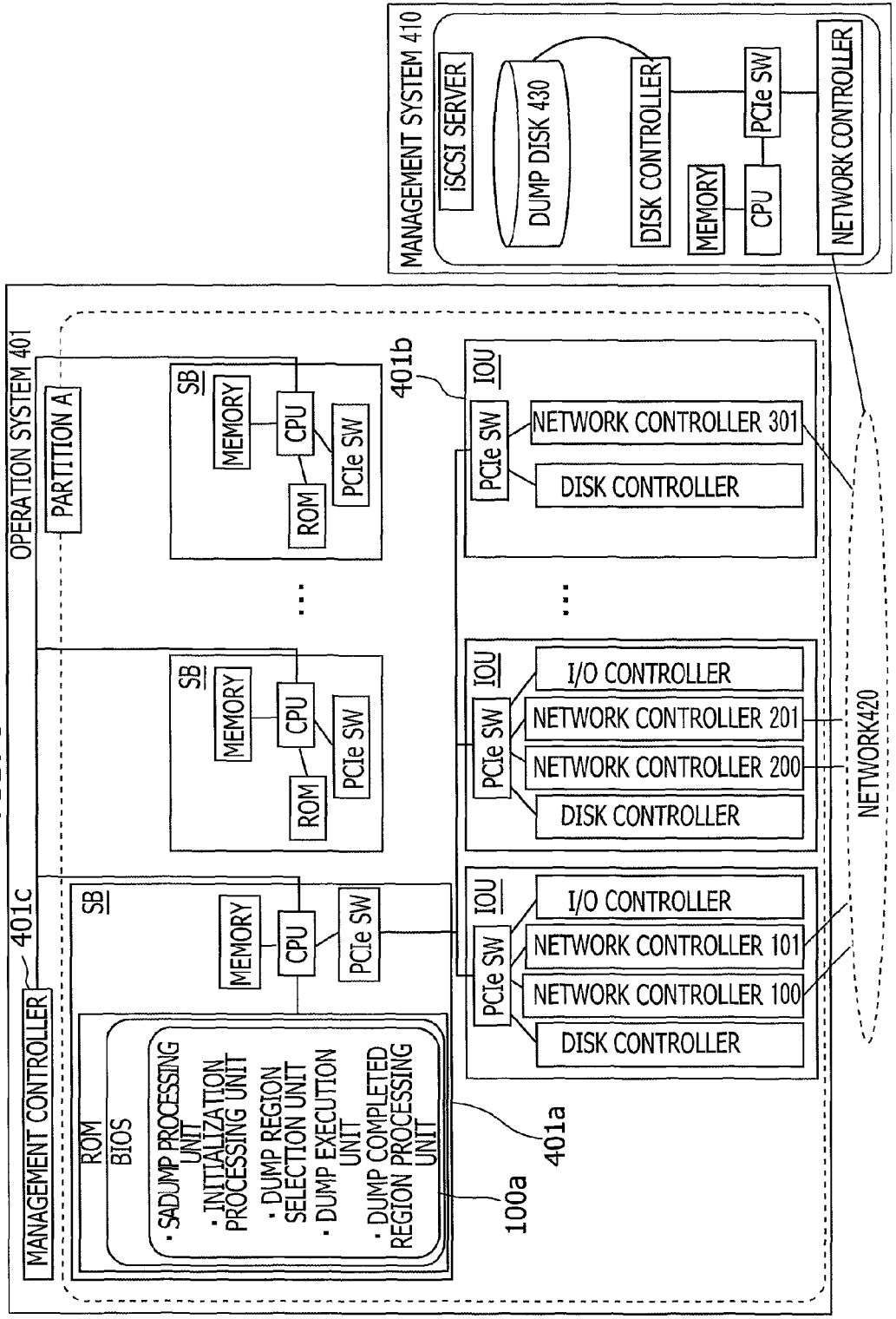
FIG. 8 is a diagram illustrating an operation system and a management system in an embodiment.

FIG. 8 is a diagram illustrating an operation system 401 and a management system 410 according to the embodiment. The operation system 401 and the management system 410 are interconnected via the network 420.

The operation system 401 is an information processing apparatus. The operation system 401 is different from the operation system 701 in the comparative example in terms of including a SADUMP processing unit 100a.

The management system 410 is a storage device. The management system 410 saves data received from the operation system 401 via the network 420 in a dump disk 430. The management system 410 is and information processing apparatus including a CPU, a memory, a PCIeSW, a network controller and a dump disk 430. FIG. 8 illustrates the management system 410 as an Internet Small Computer System Interface (iSCSI) server. The management system 410 is not, however, limited to the iSCSI server. The management system 410 may adopt a variety of systems on condition that the system is the storage device connectable to the operation system 401. The management system 410 may also be a storage device provided on, e.g., a Storage Area Network (SAN), a Network Attached Storage (NAS) or a cloud system. The management system 410 is one example of an "external storage device".

<Processing Block of SADUMP Processing Unit 100a>

Figure 9:
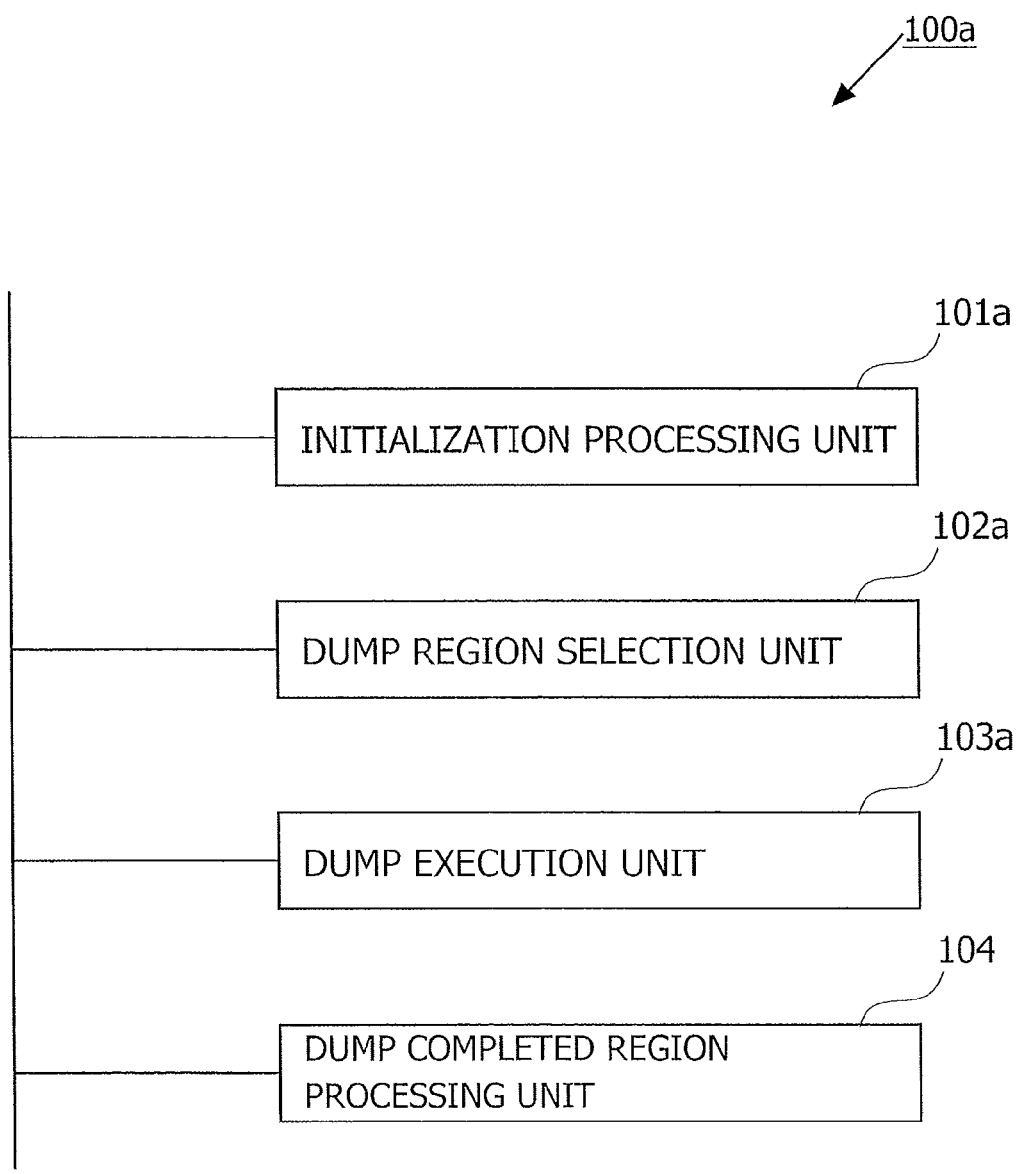
FIG. 9 is a diagram illustrating processing blocks of the SADUMP processing unit.

FIG. 9 is a diagram illustrating processing blocks of the SADUMP processing unit 100a. FIG. 9 illustrates an initialization processing unit 101a, a dump region selection unit 102a, a dump execution unit 103a and a dump completed region processing unit 104 as the processing blocks of the SADUMP processing unit 100a. The CPU equipped in the system board 401a in FIG. 8 executes the computer program deployed in the executable manner on the memory to operate as the respective processing blocks in FIG. 9. However, at least a part of any one of the blocks in FIG. 9 may include a hardware circuit.

The initialization processing unit 101a executes an initializing process of the SADUMP process. The initialization processing unit 101a is different from the initialization processing unit 101 in terms of connecting the network controller of the IO unit 401b to the management system 410 through iSCSI.

The dump region selection unit 102a selects a SADUMP target system board 401a from the system board 401a included in the partition A. The dump region selection unit 102a determines whether there exist the system boards 401a or the IO units 401b not yet completing the SADUMP process. The dump region selection unit 102a selects the system board 401a with the SADUMP process being finished in a short period of time from within the system boards 401a not yet completing the SADUMP process. Processing time of the SADUMP process increases corresponding to a capacity of the memory mounted on the processing target system board 401a. This being the case, the dump region selection unit 102a selects preferentially the system board 401a with a small quantity of memories as the SADUMP processing target.

More specifically, the dump region selection unit 102a acquires the system address map form the register of the CPU. The dump region selection unit 102a selects, based on the acquired system address map, the system board 401a with the small quantity of memories as the SADUMP processing target.

The dump execution unit 103a to be described later on distributes the dump data to a plurality of network controllers, and the distributed pieces of information are output to the management system 410. Therein, the dump region selection unit 102a may segment the address region allocated to the selected system board 401a, based on the number of the network controllers included in the partition A.

The dump region selection unit 102a further selects the IO unit 401b as the dump region when selecting the dump region for the first time. The dump process of the IO unit 401b is executed as a dump process for the MMCFG region. A usage quantity of the MMCFG region increases corresponding to the number of the IO units mounted on the IO unit 401b. Processing time of the dump process for the IO unit 401b consequently rises corresponding to the number of the IO devices mounted on the IO unit 401b. It is therefore preferable for the dump region selection unit 102a to select the JO unit 401*b* having the minimum number of IO devices. The dump region selection unit 102*a* is one example of a "selecting".

The dump execution unit 103*a* is different from the dump execution unit 103 in terms of outputting the dump data to the management system 410. The dump execution unit 103*a* may distribute the dump data to the plurality of network controller, and may output the distributed pieces of dump data to the management system 410. The dump execution unit 103*a* is one example of an "executing".

The dump completed region processing unit 104 generates the new partition by combining together the system board 401*a* and the IO unit 401*b* with the dump process being completed. The dump completed region processing unit 104 instructs the management controller 401*c* to separate the system board 401*a* or the IO unit 401*b* with the dump process being finished from the partition A, the dump process being executed by the dump execution unit 103*a*. The dump completed region processing unit 104 further instructs the management controller 401*c* to generate the new partition by using the system board 401*a* and the IO unit 401*b* separated from the partition A.

The management controller 401*c* separates the system board 401*a* or the IO unit 401*b* specified by the instruction of the dump completed region processing unit 104 from the partition A. The management controller 401*c* separates the system board 401*a* from the partition A by, e.g., "hot-remove". The management controller 401*c* separates the IO unit 401*b* from the partition A by, e.g., "hot-plug" of the PCI. The management controller 401*c* generates the new partition by the system board 401*a* and the IO unit 401*b* separated from the partition A. When the already-generated partition exists, the management controller 401*c* may add the separated system board 401*a* and IO unit 401*b* to the generated partition. The management controller 401*c* adds the system board 401*a* to the generated partition by, e.g., "hot-add". The management controller 401*c* adds the IO unit 401*b* to the generated partition by, e.g., "hot-plug" of the PCI. The dump completed region processing unit 104 and the management controller 401*c* are one example of a "generating".

<Flow of SADUMP Process in Embodiment>

Figure 10:
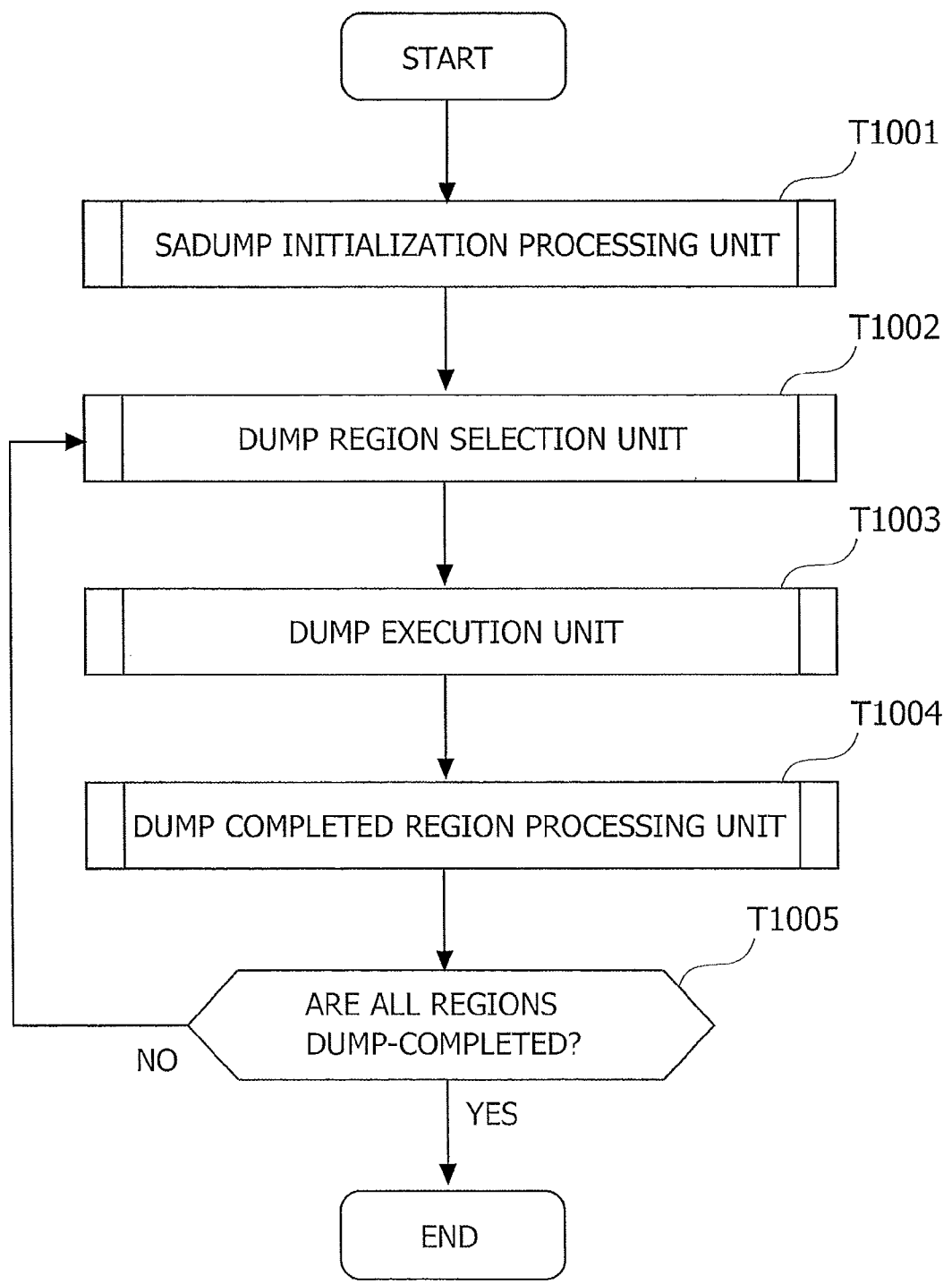
FIG. 10 is a flowchart illustrating a flow of the SADUMP process in the embodiment.

FIG. 10 is a diagram illustrating a flow of the SADUMP process in the embodiment. The flow of the SADUMP process of the SADUMP processing unit 100*a* upon the occurrence of the fault in the partition A, will hereinafter be described with reference to FIG. 10.

The initialization processing unit 101*a* executes the initializing process in T1001. The initializing process includes a process of initializing the network controller to which the management system 410 becoming as an output destination of the dump data is connected. The dump region selection unit 102*a* selects the SADUMP processing target region in T1002. The SADUMP processing target region is selected from the system board 401*a* and the IO unit 401*b* included in the partition with the fault being caused in the embodiment. In T1003, the dump execution unit 103*a* executes the dump process for the region selected in T1002. The dump completed region processing unit 104 instructs the management controller 401*c* to separate the system board 401*a* and the IO unit 401*b* with the dump process being completed from the partition A in T1004. The dump completed region processing unit 104 further instructs the management controller 401*c* to generate the new partition by using the separated system board 401*a* and IO unit 401*b*. It is determined in T1005 whether the SADUMP processes for all of the system boards 401*a* and the IO units 401*b* included in the partition A are completed. When the system board 401*a* or the IO unit 401*b* not yet completing the SADUMP process exists, the processing advances to T1002. When the SADUMP processes for all of the system boards 401*a* and the IO units 401*b* are completed, the SADUMP process is terminated.

Figure 11:
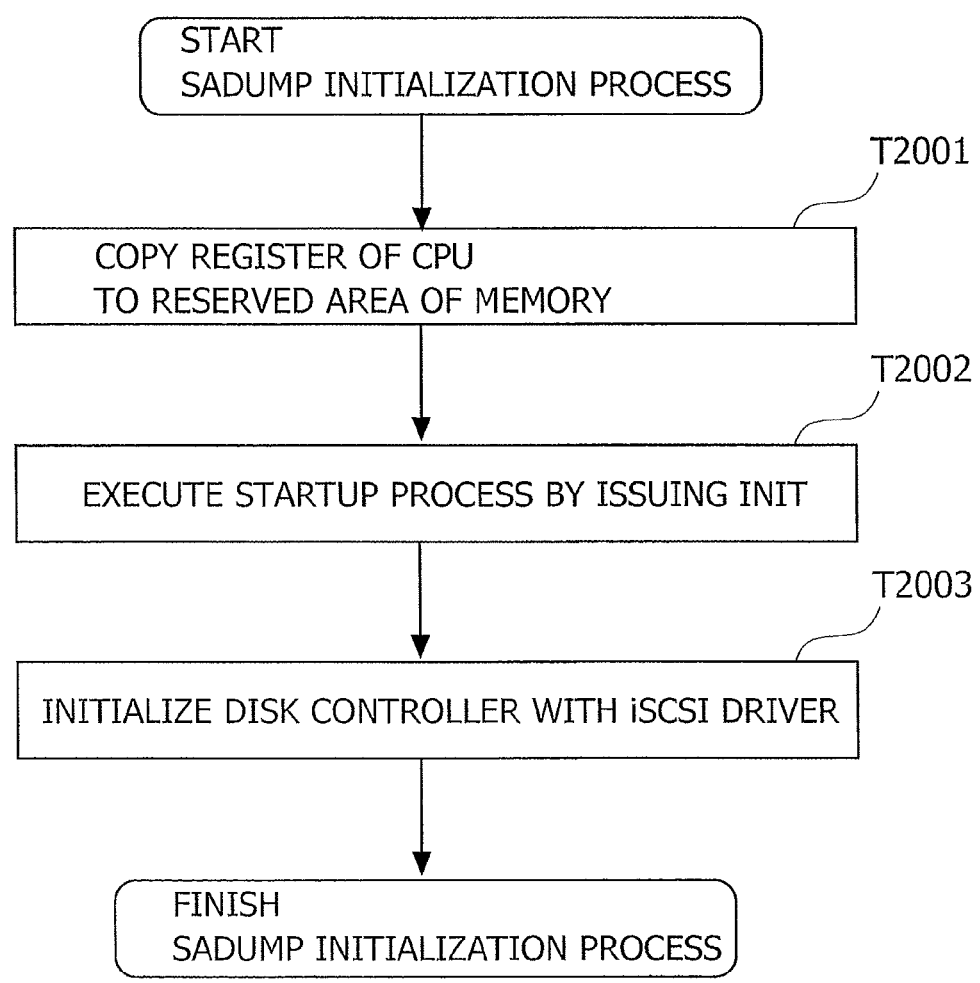
FIG. 11 is a flowchart illustrating a processing flow of an initialization processing unit in the embodiment.

FIG. 11 is a flowchart illustrating a processing flow of the initialization processing unit 101*a* in the embodiment. FIG. 11 illustrates details of the process in T1001 of FIG. 10. The processing flow of the initialization processing unit 101*a* will hereinafter be described with reference to FIG. 11.

Processes in T2001-T2002 are the same as the processes in T201-T202 of FIG. 5. Accordingly, the explanations thereof are omitted. The initialization processing unit 101*a* connects the network controller of the IO unit 401*b* to the management system 410 by iSCSI in T2003.

Figure 12:
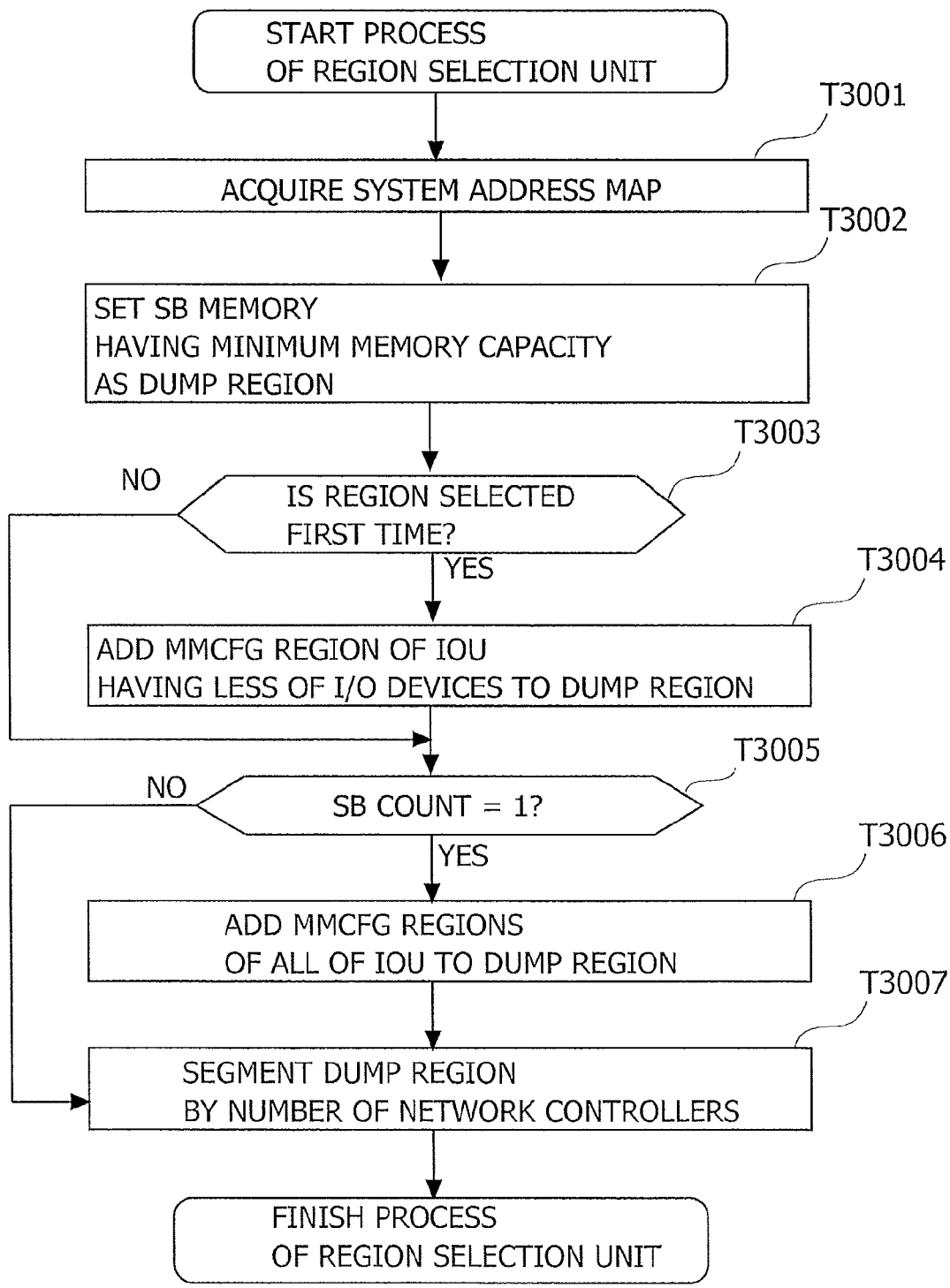
FIG. 12 is a flowchart illustrating a processing flow of a dump region selection unit in the embodiment.

FIG. 12 is a flowchart illustrating a processing flow of the dump region selection unit 102*a* in the embodiment. FIG. 12 illustrates details of the process in T1002 of FIG. 10. The processing flow of the dump region selection unit 102*a* will hereinafter be described with reference to FIG. 12.

A process in T3001 is the same as the process in T301 of FIG. 6. Accordingly, the explanation thereof is omitted. The dump region selection unit 102*a* selects the system board 401*a* becoming the SADUMP processing target from the partition A encountering the occurrence of the fault in T3002. For example, the dump region selection unit 102*a* selects the system board 401*a* having a minimum quantity of memories as the SADUMP processing target.

When the SADUMP processing target is selected for the first time (YES in T3003), the processing advances to T3004. Whereas when the SADUMP processing target is not selected for the first time (NO in T3003), the processing diverts to T3005.

The MMCFG region of the IO unit 401*b* having the small number of IO devices is selected as the SADUMP processing target in T3004. The processes in T3002 and T3004 are one example of a process of "selecting, upon occurrence of a fault in the partition, a unit as a processing target of a dump process of acquiring unit information from the units included in the partition with the occurrence of the fault". The process in T3004 is also one example of a process of "the selecting includes selecting preferentially the system board having a small capacity of the memory or the IO unit having a small number of IO devices".

When the number of the system boards 401*a* included in the partition A is "1" (YES in T3005), the processing advances to T3006. Whereas when the number of the system boards 401*a* included in the partition A is not "1" (NO in T3005), the processing diverts to T3007.

The dump region selection unit 102*a* selects the MMCFG regions of all of the system boards 401*a* and the IO units 401*b* included in the partition A as the SADUMP processing target regions in T3006.

The dump region selection unit 102*a* segments the selected regions by the number of the network controllers included in the partition A in T3007. The data of the segmented regions are distributed to the network controllers different from each other in a process T4001 of FIG. 13 to be illustrated later on, and the distributed items of data are output to the management system 410. The process in T3007 is one example of a process of "segmenting the information acquired by the dump process from the selecting by a number of the network controllers included in the partition with the occurrence of the fault".

Figure 13:
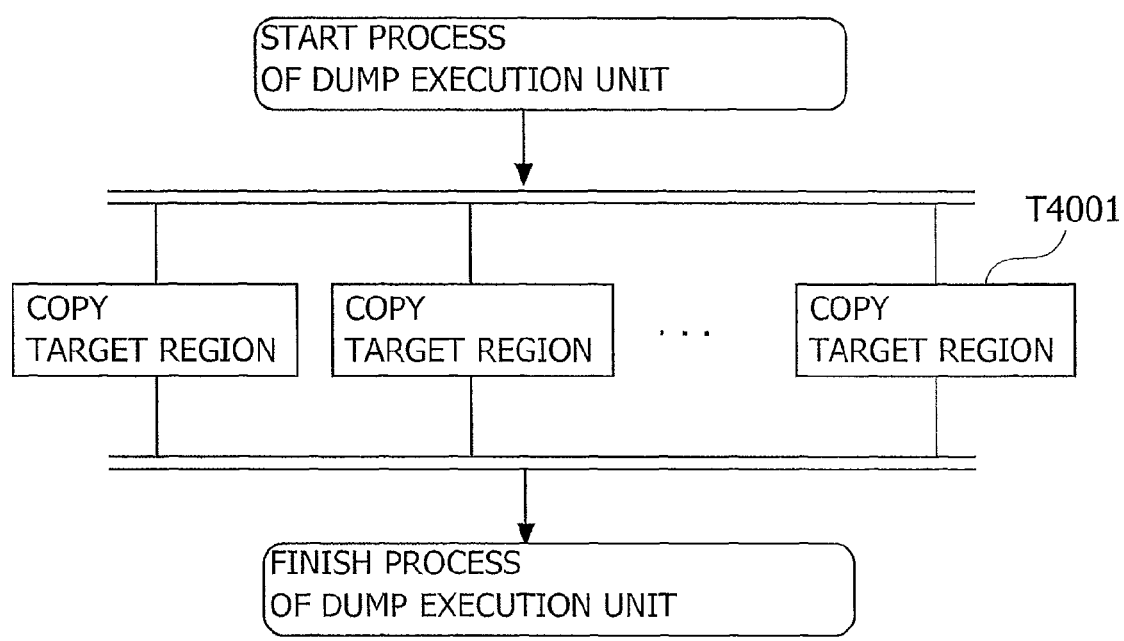
FIG. 13 is a flowchart illustrating a processing flow of a dump execution unit in the embodiment.

FIG. 13 is a flowchart illustrating a processing flow of the dump execution unit 103*a* in the embodiment. FIG. 13 illustrates details of the process in T1003 of FIG. 10. The processing flow of the dump execution unit 103*a* will hereinafter be described with reference to FIG. 13.

The dump execution unit 103*a* executes the SADUMP process of the dump region selected by the dump region selection unit 102*a* in T4001. The dump execution unit 103*a* outputs, as the SADUMP process, the dump data read from the memory of the system board 401*a* to the management system 410. The dump execution unit 103*a* may distribute, when outputting the dump data to the management system 410, the dump data to the plurality of network controllers included in the partition A, and may output the distributed pieces of dump data to the management system 410. The dump data being distributed to the plurality of network controllers, it is expected to improve a transfer speed of the dump data to the management system 410. The process in T4001 is one example of a process of "executing the dump process for the unit selected by the selecting". The process in T4001 is one example of "outputting the information acquired by the dump process to the external storage device". The process in T4001 is one example of "distributing the segmented pieces of information to the network controllers, and thus outputting the information to the external storage device".

FIG. 14A is a flowchart illustrating a processing flow of the dump completed region processing unit 104 in the embodiment. FIG. 14A illustrates processes performed by the dump completed region processing unit 104 of the SADUMP processing unit 100*a*, the management controller 401*c* and a partition B. The partition B is one example of "a partition operating as an information processing unit by combining the units". The processing flow of the dump completed region processing unit 104 will hereinafter be described with reference to FIG. 14A.

The dump completed region processing unit 104 instructs the management controller 401*c* to separate the system board 401*a* and the IO unit 401*b* with the dump process being completed from the partition A in T5001. The dump completed region processing unit 104 further instructs the management system 410 to generate the partition B by using the separated system board 401*a* and IO unit 401*b*.

The management controller 401*c* separates the system board 401*a* and the IO unit 401*b* specified by the dump completed region processing unit 104 from the partition A in T5002. The system board 401*a* is separated from the partition A by, e.g., "hot-remove". The IO unit 401*b* is separated from the partition A by, e.g., "hot-plug".

The management controller 401*c* generates the new partition in T5003. The new partition corresponds to the partition B in FIG. 14A. The management controller 401*c* generates the partition B by combining the system board 401*a* and the IO unit 401*b* that are separated from the partition A. The processes in T5001-T5003 are one example of a process of "generating a new partition by combining the units completed execution of the dump process".

Figure 15A:
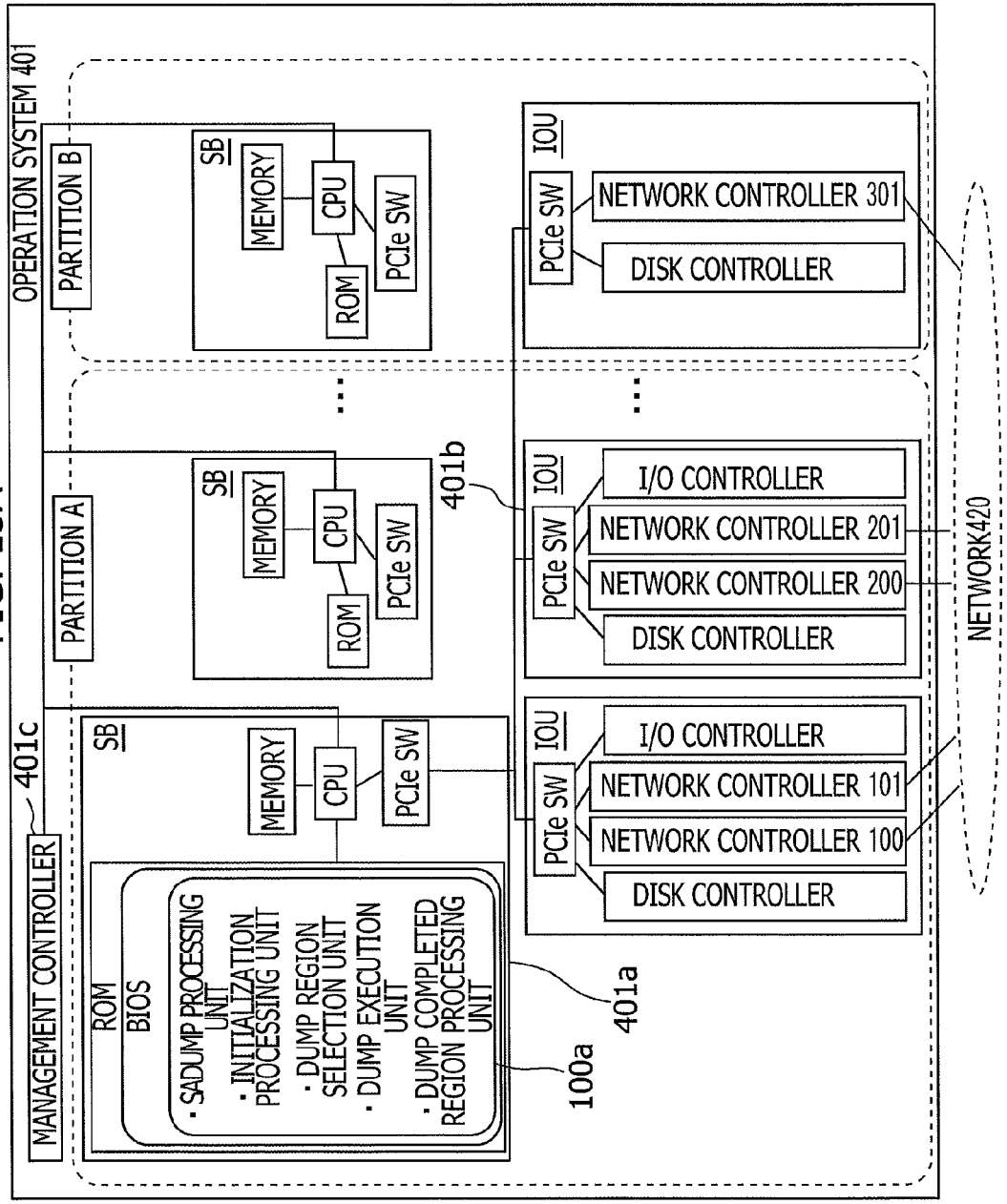
FIG. 15A is a diagram illustrating the operation system in which a new partition is generated.

The management controller 401*c* starts up the partition B in T5004. FIG. 15A is a diagram illustrating the operation system 401 including the generated partition B. The partition B is generated by the system board 401*a* and the IO unit 401*b* with the SADUMP process being finished in FIG. 15A. The partition B is in a fallback operation at this stage and can take over the service being provided so far by the partition A.

Figure 14B:
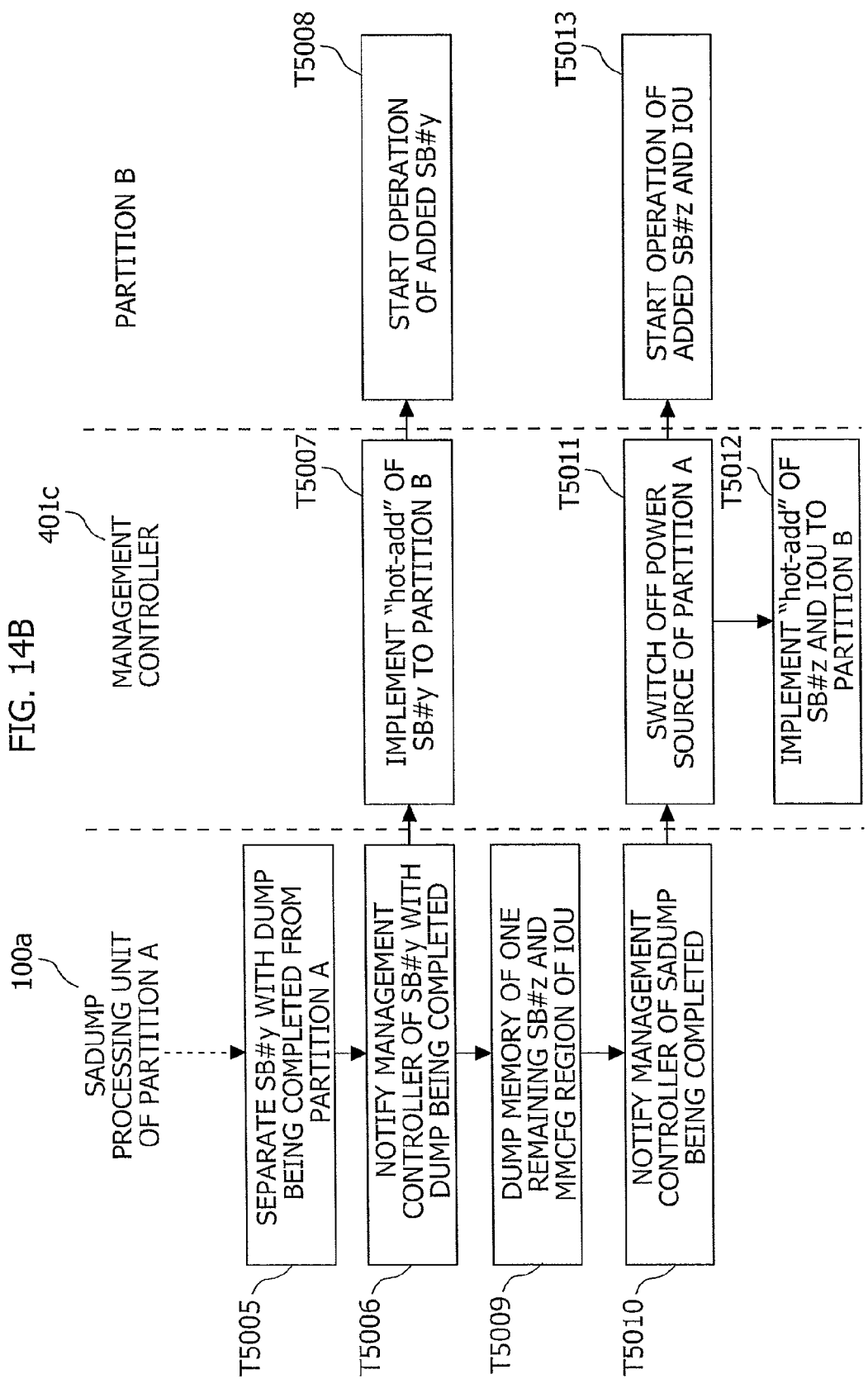
FIG. 14B is a flowchart illustrating a processing flow when completing the SADUMP process in the embodiment.

FIG. 14B is a diagram illustrating a processing flow when completing the SADUMP process in the embodiment. FIG. 14B illustrates processes of the SADUMP processing unit 100*a*, the management controller 401*c* and the partition B.

The processes upon the completion of the SADUMP process will hereinafter be described with reference to FIG. 14B.

Processes in T5005-T5007 are the same as the processes in T5001-T5003 of FIG. 14A. Accordingly, the explanations thereof are omitted.

The partition B including the system board 401*a* added in T5007 operates in T5008. The system board 401*a* is added to the partition B by using, e.g., "hot-add" without stopping the service of the partition B.

Figure 15B:
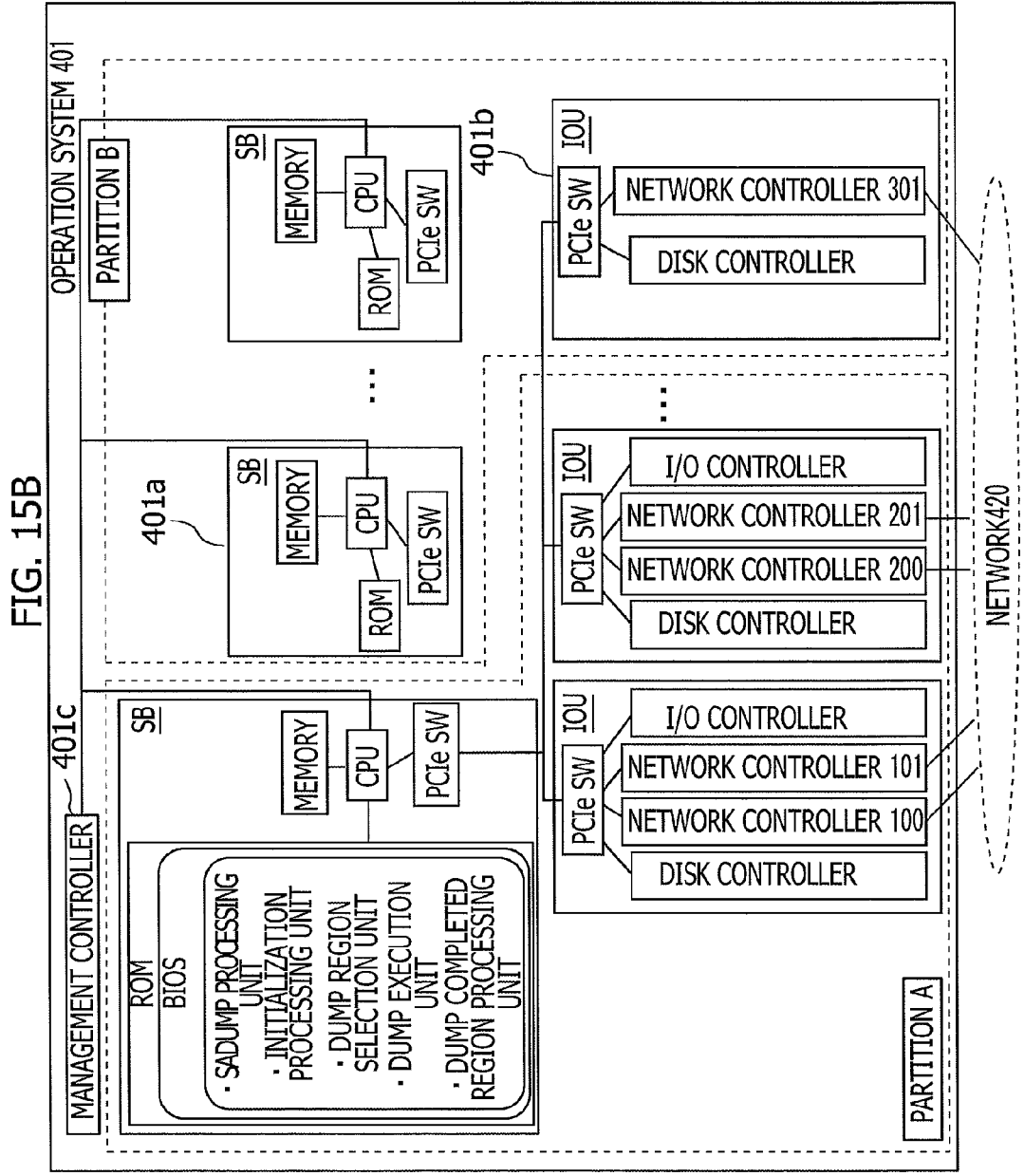
FIG. 15B is a diagram illustrating the operation system in which a system board is added to the new partition.

FIG. 15B is a diagram illustrating the operation system 401 including the partition B to which the system board 401*a* is added. The partition B includes the two system boards 401*a* and one IO unit 401*b* in FIG. 15B. The partition A includes one system board 401*a* and the two IO units 401*b*.

A process, when the partition A includes one system board 401*a*, is executed in T5009. The dump execution unit 103*a* executes the SADUMP process about the system board 401*a* and the MMCFG regions of all of the IO units 401*b* included in the partition A.

The dump completed region processing unit 104 notifies the management controller 401*c* that the SADUMP process has been finished in T5010.

The management controller 401*c* receiving the notification in T5010 switches OFF a power source of the partition A in T5011.

The management controller 401*c* separates, from the partition A, all of the system boards 401*a* and the IO units 401*b* included in the partition A in T5012. The separated system boards 401*a* and IO units 401*b* are added to the partition B.

The partition B including the added system boards 401*a* and IO units 401*b* in T5012 starts operating in T5013. The processes in T5001-T5013 described above enable the partition B can to take over the system boards 401*a* and the IO units 401*b* included so far in the partition A. The fallback operation of the partition B is canceled at this stage. The partition B can provide the service being provided so far by the partition A as a normal operation.

Figure 16:
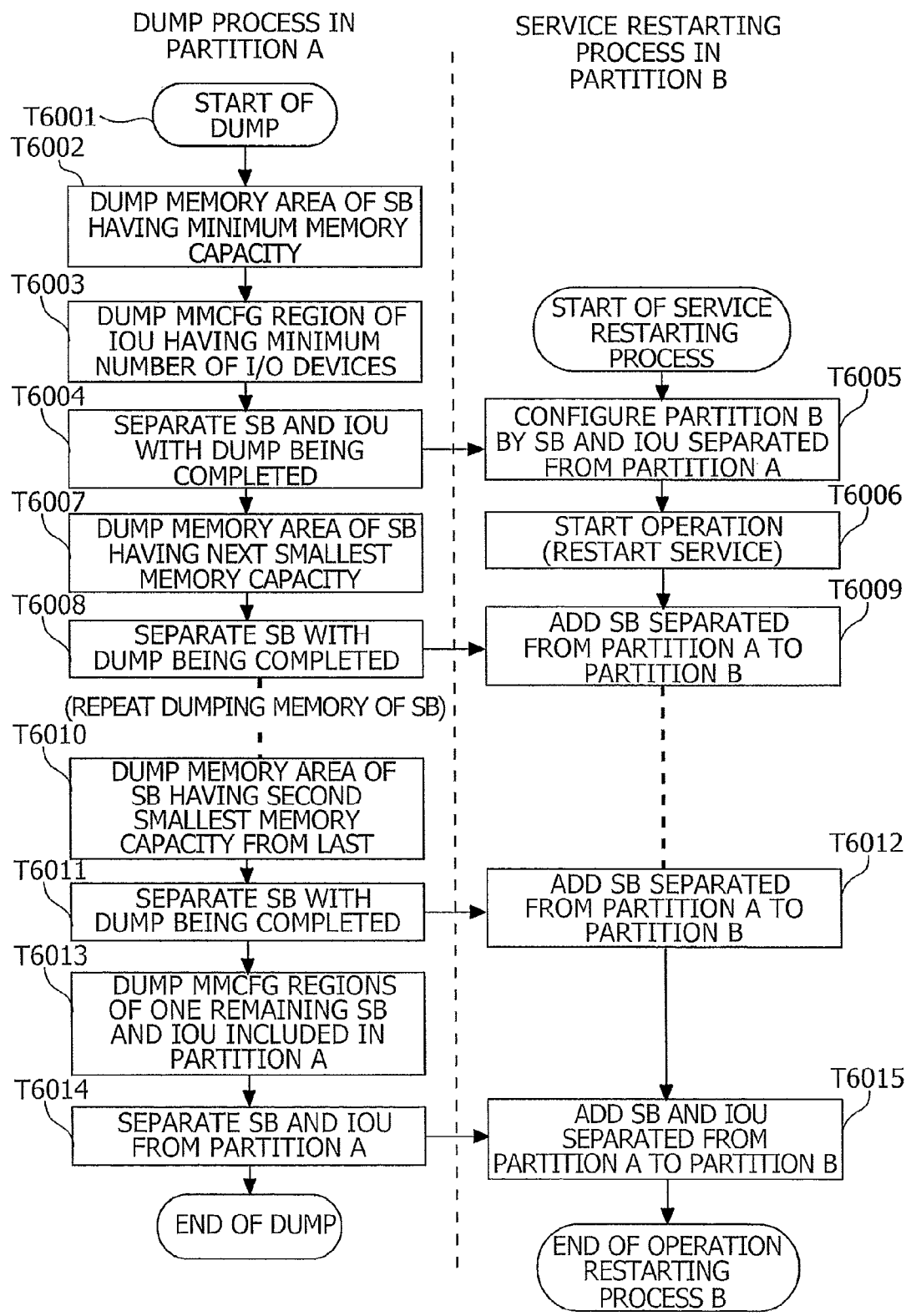
FIG. 16 is a flowchart illustrating a flow of the SADUMP process in the embodiment.

FIG. 16 is a flowchart illustrating a flow of the SADUMP process in the embodiment. FIG. 16 illustrates an entire flow of the SADUMP process described above. FIG. 16 depicts respective processes of the partition A with the occurrence of the fault and the partition B generated by the system board 401 and other equivalent components with the SADUMP process being finished. The entire flow of the SADUMP process in the embodiment will hereinafter be described with reference to FIG. 16.

The initialization process of the SADUMP process is carried out in T6001. The process in T6001 is the same as the processes in T2001-T2003 of FIG. 11. Hence, the explanation thereof is omitted. In T6002, the SADUMP process described in T4001 of FIG. 13 is executed for the system board 401*a* selected in T3002 of FIG. 12. In T6003, the SADUMP process described in T4001 of FIG. 13 is executed for the IO unit 401*b* selected in T3004 of FIG. 12.

Processes in T6004-T6006 are the same as the processes in T5001-T5004 of FIG. 14A. Accordingly, the explanations thereof are omitted. A process in T6007 is the same as the process in T6002. Accordingly, the explanation thereof is omitted. Processes in T6008-T6009 are the same as the processes in T5001-T5003 of FIG. 14A. Therefore, the explanations thereof are omitted. A process in T6010 is the same as the process in T6002. Accordingly, the explanation thereof is omitted. Processes in T6011-T6012 are the same as the processes in T5001-T5003 of FIG. 14A. Hence, the explanations thereof are omitted. Processes in T6013-T6015 are the same as the processes in T5007-T5011 of FIG. 14B. Hence, the explanations thereof are omitted.

The dump process involves using the network controller mounted beforehand in the partition A in the embodiment. The network controller might not therefore be added for the dump process.

The dump data is saved in the management system 410 connected to the network 420 in the embodiment. The management system 410 can be shared between or among a plurality of operation systems 401 via the network 420. A cost can be therefore reduced to a greater degree than by preparing the storage device to store the dump data for every operation system 401.

The dump data is distributed to the plurality of network controllers and thus output to the management system 410 in the embodiment. A period of time for outputting the information to the management system 410 can be reduced.

The SADUMP process is executed preferentially for the system board 401a and the IO unit 401b with the SADUMP process being early completed in the embodiment. The new partition is generated by the system board 401a and the IO unit 401b with the SADUMP process being completed. The new partition taking over the service of the partition with the fault being caused is therefore generated fast. As a result, a service operating ratio is restrained from decreasing.

The new partition receives the additions of the system board 401a and the IO unit 401b with the SADUMP process being completed in the embodiment. The service operating ratio is consequently restrained from decreasing while acquiring the dump data of all of the system boards 401a and the IO units 401b included in the partition with the occurrence of the fault in the embodiment.

Working Example

Figure 17:
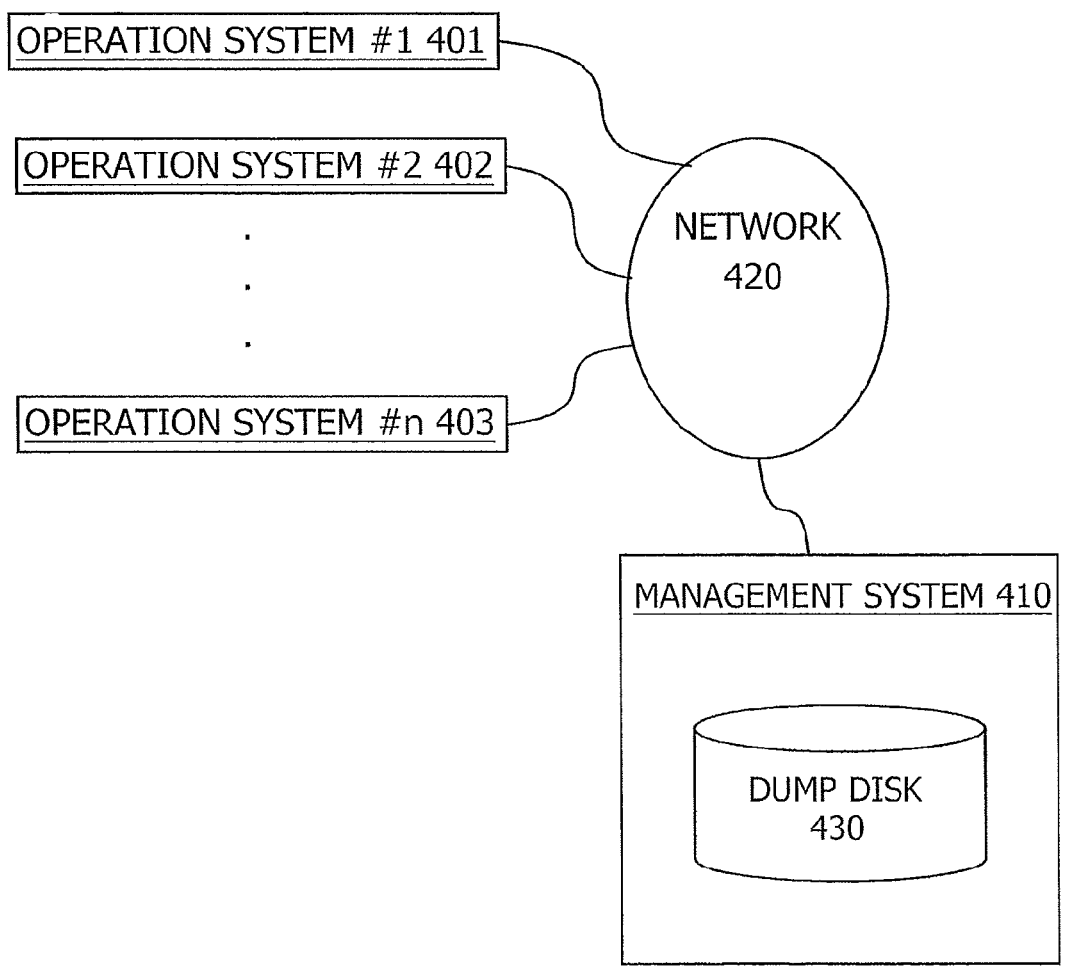
FIG. 17 is a diagram illustrating a configuration of a working example.

A working example of the embodiment discussed above will be described. FIG. 17 is a diagram illustrating a configuration of the working example. FIG. 17 depicts an operation system #1 401, an operation system #2 402, an operation system #n 403, the network 420 and the management system 410. The operation system #1 401, the operation system #2 402, the operation system #n 403 and the management system 410 are interconnected via the network 420. The operation system #1 401, the operation system #2 402 and the operation system #n 403 correspond to the operation system 401 in the embodiment. The working example will hereinafter be described with reference to the drawings. Note that the same components as the components in the comparative example or the embodiment are marked with the same numerals and symbols, and in-depth descriptions thereof are omitted in the working example.

FIGS. 18-21 are diagrams illustrating the operation system 401 as the SADUMP processing target. FIG. 22 is a flowchart illustrating a flow of the SADUMP process in the working example. The working example will hereinafter be described with reference to FIGS. 18-22.

Figure 18:
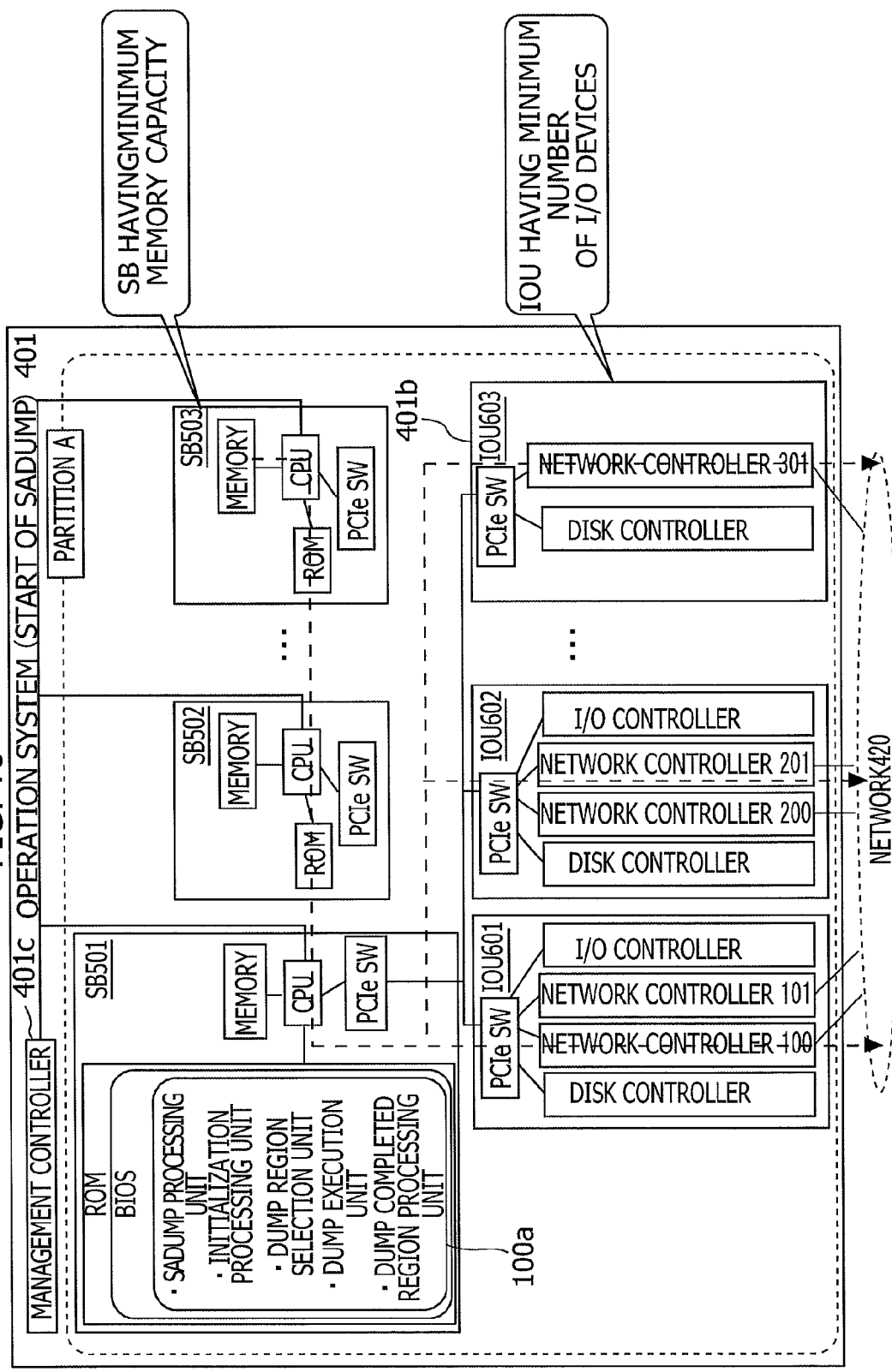
FIG. 18 is a diagram illustrating the operation system in the working example.

FIG. 18 illustrates the operation system 401 in the working example. FIG. 18 depicts the operation system 401 and the network 420. The operation system 401 includes the partition A. The partition A includes system boards 501-503 and IO units 601-603. The system boards 501-503 correspond to the system board 401a in the embodiment. The IO units 601-603 correspond to the IO unit 401b in the embodiment.

Capacities of memories of the system boards 501-503 decrease in the sequence of the system board 501, the system board 502 and the system board 503.

The IO unit 603 has a minimum number of IO devices among the IO units 601-603. The IO units 601 and 602 have the same number of IO devices.

FIG. 22 is a flowchart illustrating a flow of the SADUMP process in the operation system 401 illustrated in FIG. 18. The OS of the partition A stops due to some sort of fault in T7001 of FIG. 22. The SADUMP processing unit 100a starts the SADUMP process in T7002. The SADUMP initialization process described based on FIG. 11 is executed in T7002. The selection of the dump region and the SADUMP process, which are described based on FIGS. 12 and 13, are executed in T7003. The SADUMP processing unit 100a notifies the management controller 401c that the SADUMP process of the system board 503 is completed in T7004. The management controller 401c generates the partition B in T7101. The generated partition B receives an addition of the system board 503 in T7102.

The SADUMP process of the IO unit 603 is executed in T7005 of FIG. 22. The management controller 401c is notified of the completion of the SADUMP process of the IO unit 603 in T7006. The partition B receives an addition of the IO unit 603 in T7103. The management controller 401 starts up the partition B in T7104. The system of the partition B is started up in T7201. The partition B including the system board 503 and the IO unit 603 starts operating in T7202. The partition B in the fallback operation status can take over the service being provided so far by the partition A at this stage.

Figure 19:
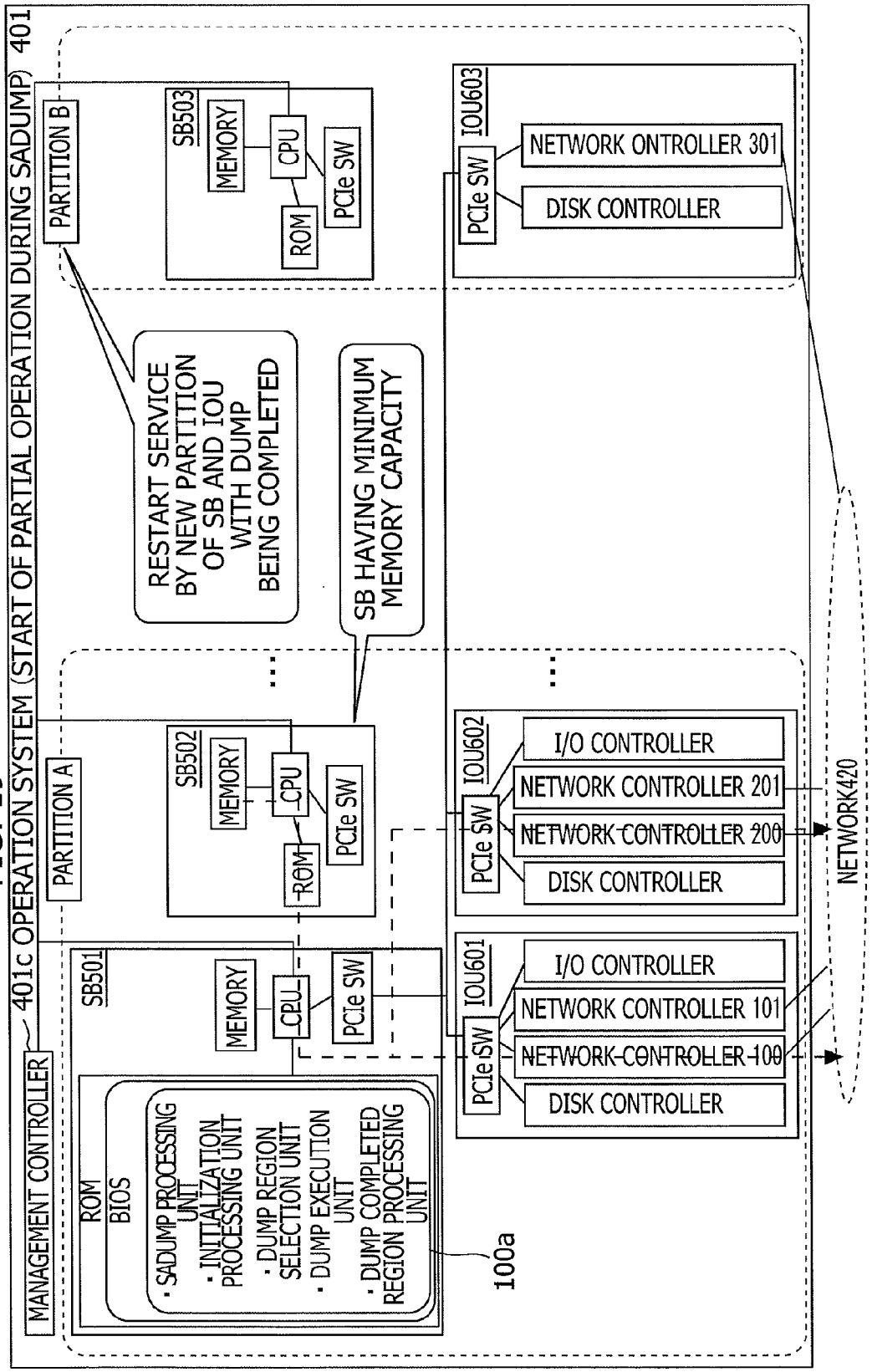
FIG. 19 is a diagram illustrating the operation system including a newly generated partition.

FIG. 19 is a diagram illustrating the operation system 401 including the newly generated partition B. The partition B is generated by the processes in T7101-T7104 of FIG. 22. FIG. 19 illustrates the partitions A and B. The partition B includes the system board 503 and the IO unit 603 with the SADUMP process being finished in FIG. 19. The partition B, when started up by the management controller 401c, takes over the service being provided so far by the partition A.

The SADUMP processing target system board is selected corresponding to the capacity of the memory, and the SADUMP process is executed for the selected system board in the processes in T7007 and T7008 of FIG. 22. The partition B receives an addition of the system board with the SADUMP process being completed in the processes in T7105 and T7203.

Figure 20:
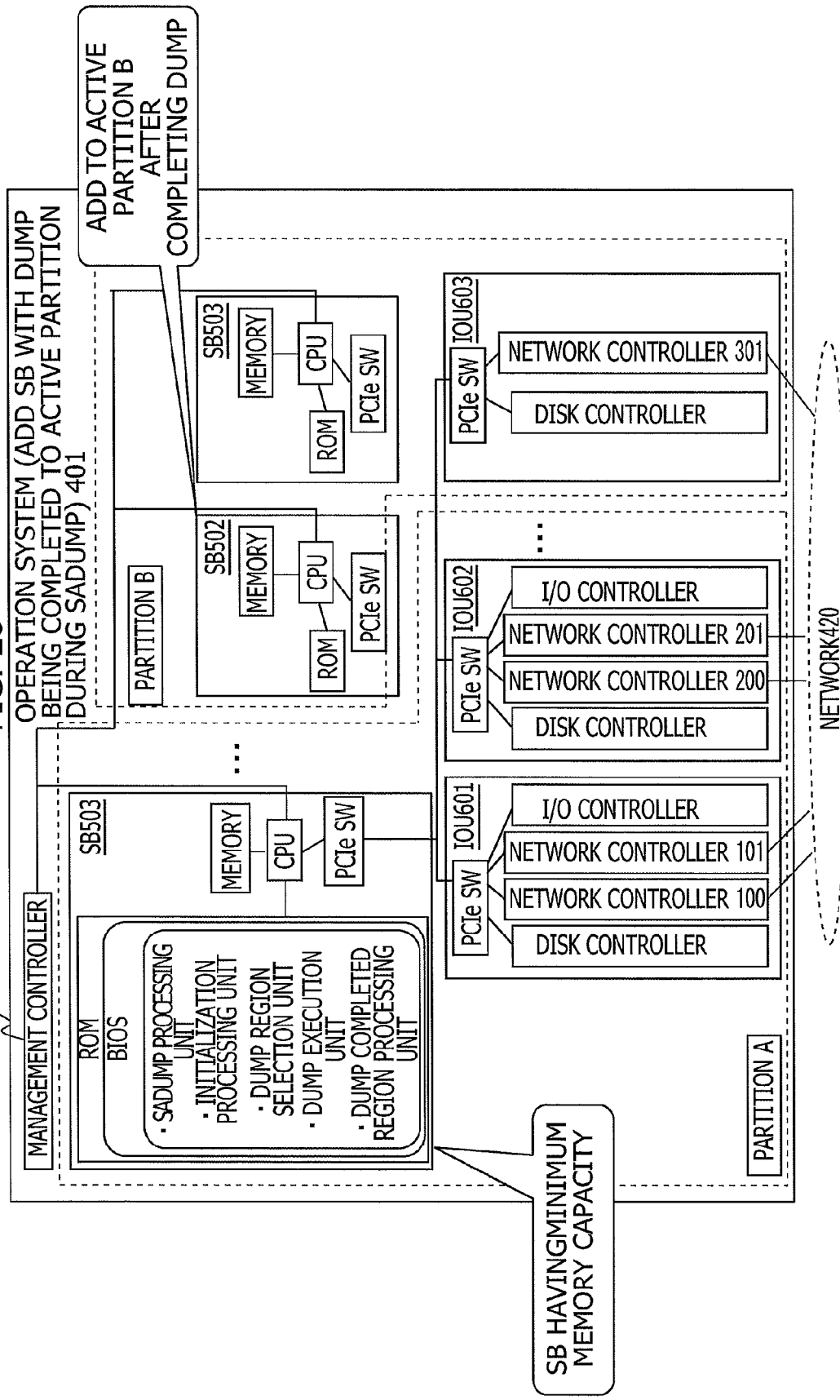
FIG. 20 is a diagram illustrating the operation system in which the system board is added to the partition.

FIG. 20 is a diagram illustrating the operation system 401 including the partition B to which the system board 502 is added. FIG. 20 depicts a status in which the system board is added to the partition B by "hot-add".

The SADUMP process for the system board 501 of the partition A is executed in T7009 of FIG. 22. The SADUMP processes for all of the IO units remaining in the partition A are further executed in T7009. The dump completed region processing unit 104 notifies the management controller 401c of the completion of the SADUMP processes for the system board 501 and the IO unit. In T7106, the partition B receives additions of the system board 501 and the IO unit with the SADUMP processes being completed in T7009. The partition B, to which the system board 503 and the IO unit are added in T7106, operates in T7204.

Figure 21:
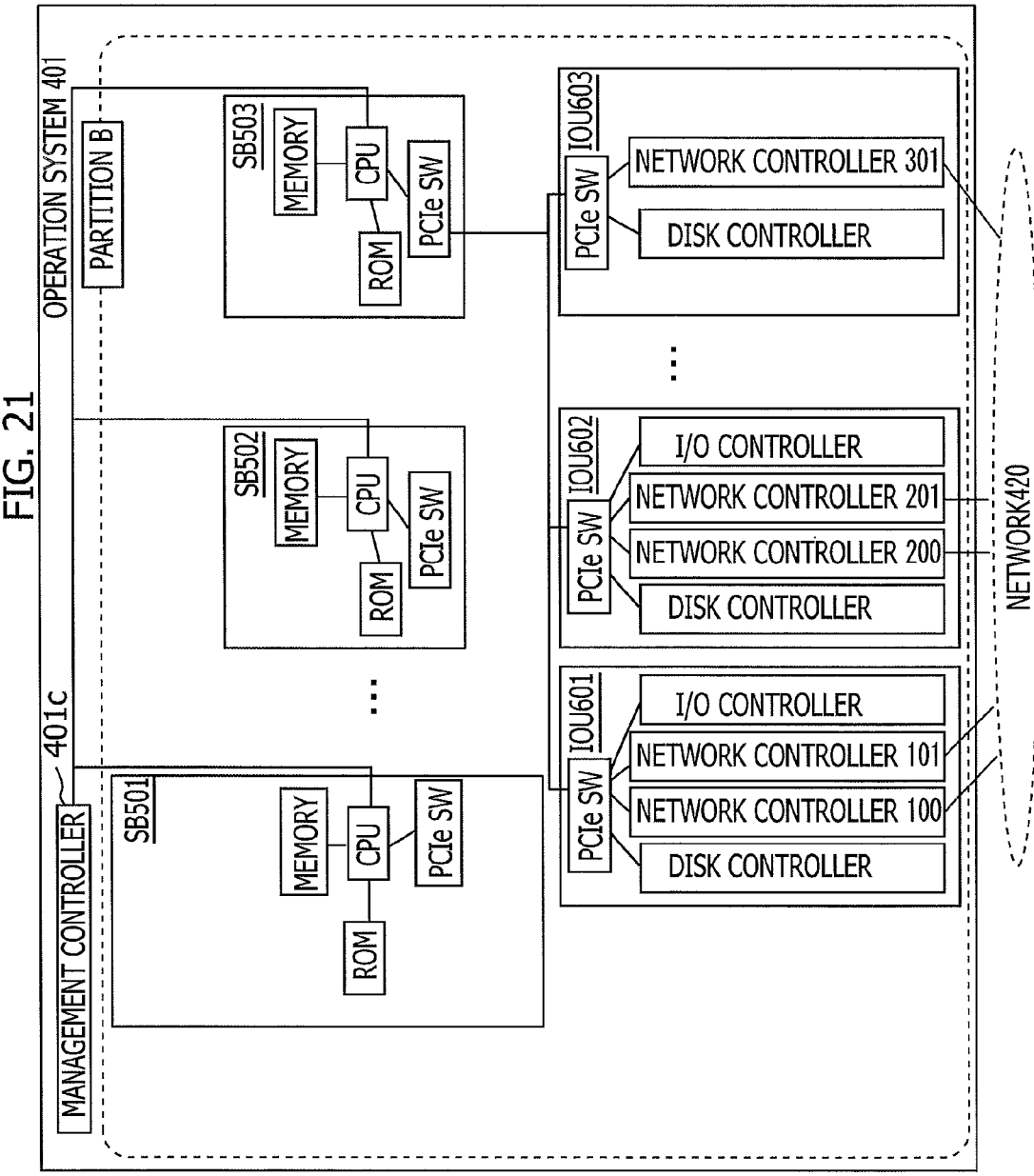
FIG. 21 is a diagram illustrating the operation system with the SADUMP process being completed.
Figure 22:
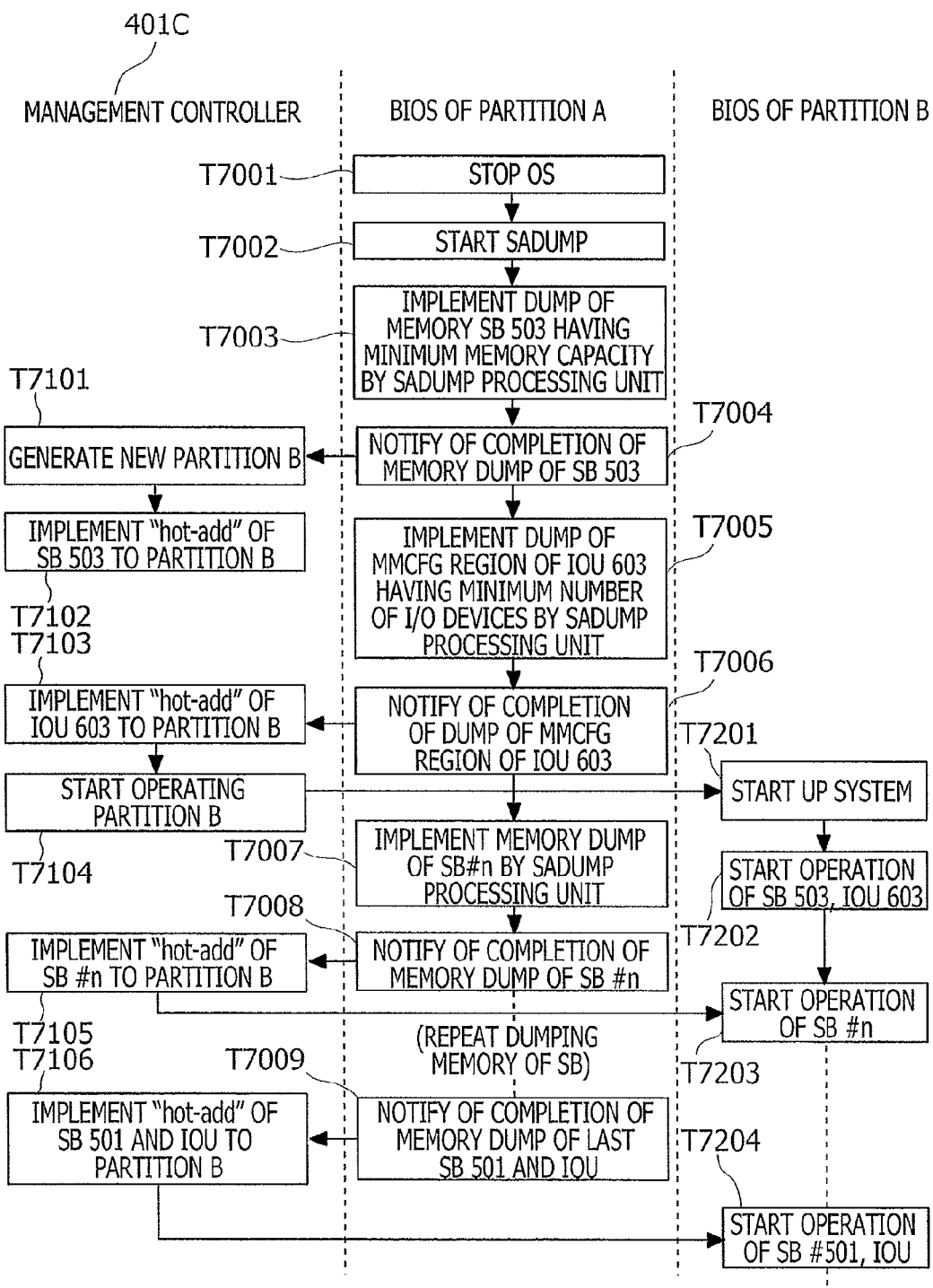
FIG. 22 is a flowchart illustrating a processing flow of a management controller and a processing flow of each partition in the working example.

FIG. 21 illustrates the operation system 401 with the SADUMP process being completed. The partition B includes all of the system boards 501-503 and the IO units 601-603 included so far in the partition A in FIG. 21. The partition B can provide at this stage the service being provided so far by the partition A as the normal operation.

The operation system 401 can restrain the decrease in service operating ratio of the information processing apparatus due to the SADUMP process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus capable of generating a partition including a plurality of units having hardware devices and the partition operating as an information processing unit by combining the units, the information processing apparatus comprising a processor executing a process that causes the information processing apparatus to perform:
    selecting, upon occurrence of a fault in the partition, a unit as a processing target of a dump process of acquiring dump data from the units included in the partition with the occurrence of the fault;
    executing the dump process for the unit selected by the selecting; and
    generating the partition by combining the units completing the execution of the dump process.

2. The information processing apparatus according to claim 1, wherein the unit includes system boards having processors and memories, and IO units having IO devices, and
    the selecting includes selecting preferentially the system board having a small capacity of the memory or the IO unit having a small number of IO devices.

3. The information processing apparatus according to claim 1, wherein the unit includes a network controller,
    the network controller connects the information processing apparatus to an external storage device via a computer network, and
    the executing includes outputting the dump data acquired by the dump process to the external storage device.

4. The information processing apparatus according to claim 3, wherein the selecting includes segmenting the dump data acquired by the dump process from the selecting by a number of the network controllers included in the partition with the occurrence of the fault, and
    the executing includes distributing the segmented pieces of dump data to the network controllers, and thus outputting the dump data to the external storage device.

5. An information processing method by which an information processing apparatus capable of generating a partition including a plurality of units having hardware devices and the partition operating as an information processing unit by combining the units, the method comprising:
    selecting, upon occurrence of a fault in the partition, a unit as a processing target of a dump process of acquiring dump data from the units included in the partition with the occurrence of the fault;
    executing the dump process for the unit selected by the selecting; and
    generating the partition by combining the units completing the execution of the dump process.

6. The information processing method according to claim 5, wherein the unit includes system boards having processors and memories, and IO units having IO devices, and
    the selecting includes selecting preferentially the system board having a small capacity of the memory or the IO unit having a small number of IO devices.

7. The information processing method according to claim 5, wherein the unit includes a network controller,
    the network controller connects the information processing apparatus to an external storage device via a computer network, and
    the executing includes outputting the dump data acquired by the dump process to the external storage device.

8. The information processing method according to claim 7, wherein the selecting includes segmenting the dump data acquired by the dump process from the selected unit by a number of the network controllers included in the partition with the occurrence of the fault, and
    the executing includes distributing the segmented pieces of dump data to the network controllers, and thus outputting the dump data to the external storage device.

9. A non-transitory computer-readable recording medium having stored there in a program for causing an information processing apparatus capable of generating a partition including a plurality of units having hardware devices and the partition operating as an information processing unit by combining the units, the program to cause the information processing apparatus to perform:
    selecting, upon occurrence of a fault in the partition, a unit as a processing target of a dump process of acquiring dump data from the units included in the partition with the occurrence of the fault;
    executing the dump process for the unit selected by the selecting; and
    generating the partition by combining the units completing the execution of the dump process.

10. The non-transitory computer-readable recording medium having stored there in the program according to claim 9, wherein the unit includes system boards having processors and memories, and IO units having IO devices, and
    the selecting includes selecting preferentially the system board having a small capacity of the memory or the IO unit having a small number of IO devices.

11. The non-transitory computer-readable recording medium having stored there in the program according to claim 9, wherein the unit includes a network controller,
    the network controller connects the information processing apparatus to an external storage device via a computer network, and
    the executing includes outputting the dump data acquired by the dump process to the external storage device.

12. The non-transitory computer-readable recording medium having stored there in the program according to claim 11, wherein the selecting includes segmenting the dump data acquired by the dump process from the selected unit by a number of the network controllers included in the partition with the occurrence of the fault, and
    the executing includes distributing the segmented pieces of dump data to the network controllers, and thus outputting the dump data to the external storage device.

* * * * *